US009045231B2

(12) United States Patent
Swain

(10) Patent No.: US 9,045,231 B2
(45) Date of Patent: Jun. 2, 2015

(54) WHEELCHAIR ACCESSIBLE LAVATORY

(71) Applicant: C&D Zodiac, Inc., Huntington Beach, CA (US)

(72) Inventor: Glenn Swain, Redondo Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 0 days.

(21) Appl. No.: 14/071,538

(22) Filed: Nov. 4, 2013

(65) Prior Publication Data

US 2014/0123571 A1 May 8, 2014

Related U.S. Application Data

(60) Provisional application No. 61/722,332, filed on Nov. 5, 2012, provisional application No. 61/858,073, filed on Jul. 24, 2013.

(51) Int. Cl.
*E04H 1/00* (2006.01)
*B64D 11/02* (2006.01)
(Continued)

(52) U.S. Cl.
CPC ........... *B64D 11/02* (2013.01); *Y10T 29/49716* (2015.01); *E06B 9/262* (2013.01); *E06B 9/0638* (2013.01); *B64D 11/0023* (2013.01)

(58) Field of Classification Search
CPC ........ E06B 9/262; E06B 9/40; E06B 9/0683; E06B 9/24; E06B 9/04; E06B 9/0669; E06B 1008/2458; B64D 11/02; B64D 2011/0046; B64D 11/0023

USPC .......... 52/34, 64.65, 70, 71, 201; 4/449, 661, 4/664; 160/206, 210, 213, 88, 89, 90, 91, 160/92, 93, 229 R, 352
See application file for complete search history.

(56) References Cited

U.S. PATENT DOCUMENTS 4,276,919 A 7/1981 Walters
4,589,463 A 5/1986 Ryan
(Continued)

FOREIGN PATENT DOCUMENTS

WO 2011101385 A2 8/2011
WO 2012110643 A1 8/2012

OTHER PUBLICATIONS

International Search Report and Written Opinion issued on Apr. 4, 2014 in related PCT/US2013/068594.
(Continued)

*Primary Examiner* — Joshua J Michener
*Assistant Examiner* — Matthew Gitlin
(74) *Attorney, Agent, or Firm* — Jeffrey Mangels; Butler & Mitchell LLP; Brennan C. Swain, Esq.

(57) ABSTRACT

A lavatory monument assembly that includes an enclosure having at least a front wall and that defines an enclosure interior, and a divider wall that extends rearwardly from the front wall. The divider wall includes a divider door that is movable between closed and open positions. In the closed position the divider door divides the enclosure interior into a first lavatory interior and a second lavatory interior. The front wall includes a first and second lavatory doors that are each movable between closed and open positions and provide access to the first lavatory interior and second lavatory interiors respectively. The front wall also includes a vertically extending center post. The second lavatory door is hingedly connected to the center post, and the center post and the second lavatory door are slidable to a stowed position when the second lavatory door is in the open position.

23 Claims, 23 Drawing Sheets

(51) Int. Cl.
*E06B 9/262* (2006.01)
*E06B 9/06* (2006.01)
*B64D 11/00* (2006.01)

(56) References Cited

U.S. PATENT DOCUMENTS

| | | | | |
|---|---|---|---|---|
| 5,678,883 | A | * | 10/1997 | Bittner et al. .................. 296/178 |
| 5,711,121 | A | * | 1/1998 | Garver ............................ 52/239 |
| 5,996,287 | A | | 12/1999 | Sullivan |
| 6,007,025 | A | * | 12/1999 | Coughren et al. ......... 244/118.6 |
| 6,079,669 | A | * | 6/2000 | Hanay et al. ................ 244/118.5 |
| 6,615,421 | B2 | * | 9/2003 | Itakura ............................. 4/664 |
| 7,152,257 | B2 | * | 12/2006 | Lasch et al. ....................... 4/661 |
| 7,284,287 | B2 | | 10/2007 | Cooper |
| 7,866,603 | B2 | * | 1/2011 | Cooper et al. ............. 244/118.5 |
| 8,671,633 | B2 | * | 3/2014 | Haab et al. .................... 52/243.1 |
| 8,752,339 | B1 | * | 6/2014 | Tubbs ............................... 52/64 |
| 2005/0116099 | A1 | | 6/2005 | Pho |
| 2005/0125891 | A1 | | 6/2005 | Stratmann |
| 2011/0258770 | A1 | | 10/2011 | Morande |
| 2013/0082140 | A1 | | 4/2013 | Ehlers et al. |
| 2014/0077033 | A1 | | 3/2014 | Scown |

OTHER PUBLICATIONS

International Search Report and Written Opinion issued on Nov. 4, 2014 in PCT/US2014/042367.

* cited by examiner

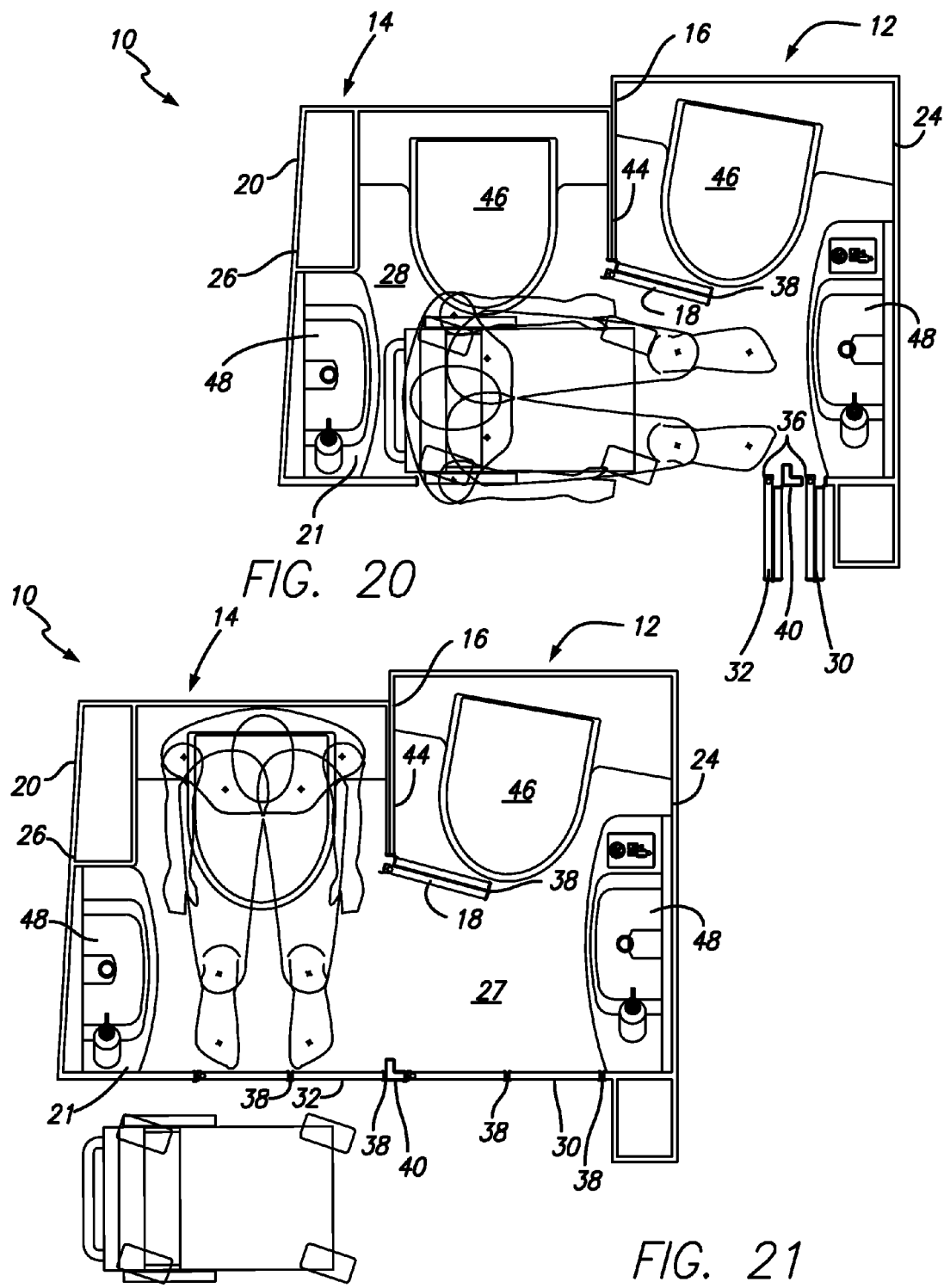

WHEELCHAIR ACCESSIBLE LAVATORY

CROSS REFERENCE TO RELATED APPLICATIONS

This application claims the benefit of U.S. Provisional Application No. 61/722,332, filed Nov. 5, 2012, and U.S. Provisional Application No. 61/858,073 filed Jul. 24, 2013 which are both herein incorporated by reference in their entireties.

FIELD OF THE INVENTION

The present invention relates generally to aircraft lavatories and more particularly to a wheelchair accessible aircraft lavatory with a movable wall.

BACKGROUND OF THE INVENTION

Commercial aircraft, such as the Airbus A320 or Boeing 737 are typically constructed from modular components, the size, weight and construction of which are dictated by many considerations, including fuselage dimensions, aesthetic and safety considerations. Many of these requirements are imposed by law or regulation. Aircraft components, such as overhead stowage compartments, seats, lavatories, galleys, lighting systems, etc. are all required to function within strictly confined spaces. Manufacturers of aircraft are constantly refining interior aircraft designs to achieve more comfort and utility for passengers and crew within carrier-imposed restraints on cost, weight, maintenance down-time, and safety. Commercial passenger aircraft generally include lavatories for use by passengers and crew.

Prior art aircraft lavatories are typically fixed structures with a rectangular footprint. There is usually a sink, toilet, mirror, and waste container in the lavatory. It is typically surrounded by composite panel walls that can be contoured to fit the aircraft curvature. Multiple lavatories can be installed in the aircraft. See, for example, U.S. Pat. No. 6,079,669 to Hanay, et al., the entirety of which is incorporated by reference herein. The door is normally 20" wide and can be a swinging door or a bi-fold one. The 20" wide door makes the lavatory difficult to access with a wheelchair.

SUMMARY OF THE PREFERRED EMBODIMENTS

In accordance with a first aspect of the present invention there is provided a lavatory monument assembly configured to be positioned in the interior of an aircraft that includes an enclosure that includes at least a front wall and that defines an enclosure interior, and a divider wall that extends rearwardly from the front wall. The divider wall includes a divider door that is movable between a closed position and an open position. In the closed position the divider door divides the enclosure interior into a first lavatory interior and a second lavatory interior. The front wall includes a first lavatory door that is movable between a closed and an open position and provides access to the first lavatory interior, a second lavatory door that is movable between a closed and an open position and provides access to the second lavatory interior, and a vertically extending center post. The second lavatory door is hingedly connected to the center post, and the center post and the second lavatory door are slidable to a stowed position when the second lavatory door is in the open position.

In a preferred embodiment, the divider door is a bi-fold door that is movable toward the front wall and is hingedly connected to the center post. Preferably, the center post, the divider door, and the second lavatory door are slidable to a stowed position when the second lavatory door is in the open position. In a preferred embodiment, the center post and second lavatory door are slidable together away from the first lavatory door. In another preferred embodiment, the center post, second lavatory door and divider door are slidable away from the first door. Preferably, the divider door is securable to the second lavatory door when the divider door is in the open position.

In a preferred embodiment, the divider door is a bi-fold door that is movable toward the rear wall. Preferably, the center post and second lavatory door are slidable toward the first lavatory door.

In accordance with another aspect of the present invention there is provided a method of operating a lavatory monument assembly that includes at least a front wall and a divider wall that extends rearwardly from the front wall to divide the lavatory monument assembly into first and second lavatory interiors. The method includes the steps of moving one of a first lavatory door that defines a first width or a second lavatory door that defines a second width from a closed position to an open position, moving a divider door from a closed position to an open position, and moving the other of the first lavatory door and the second lavatory door from a closed position to an open position to provide an opening that defines a third width. The third width is larger than the first width and the third width is larger than the second width. In a preferred embodiment, the lavatory monument assembly includes a vertically extending center post to which at least one of the first and second doors is hingedly connected, and the center post is slidable in a direction that is generally parallel to a plane defined by the front wall.

In a preferred embodiment, the method includes the step of sliding the center post from a home position to a stowed position. Preferably, the divider wall is hingedly connected to the center post and the method includes the step of securing the divider wall to one of the first or second doors prior to the step of moving the other of the first lavatory door and the second lavatory door from a closed position to an open position to provide the opening that defines the third width.

In a preferred embodiment, the method further includes the step of moving the first lavatory and the second lavatory door to the closed position while the divider door remains in the open position.

In the present invention, generally, the divider wall positioned between the first and second lavatory spaces is removed or otherwise moved out of the way. At least one of the lavatory doors is then slid inboard or outboard (depending on lavatory positioning) to create a larger opening than a single door.

The door system of the present invention allows for two single lavatories within an aircraft monument to be converted into a single larger accessible lavatory for people with disabilities and families with small children. The door system includes first and second lavatory doors, a divider door, and a movable center post. Using a combination of mortise hinges and linear tracks, the system can be manipulated to collapse the divider door between the two lavatories and along with the center door and post slide the entire system out of the way to open the two smaller standard sized door openings into one larger wide door opening (e.g., 30" in a preferred embodiment).

BRIEF DESCRIPTION OF THE DRAWINGS

FIG. 20 is a top plan view of the lavatory monument assembly of FIG. 12 in the combined lavatory configuration and showing a person in a wheelchair positioned where they can move to the toilet;

FIG. 21 is a top plan view of the lavatory monument assembly of FIG. 12 in the combined lavatory configuration (with the first and second lavatory doors closed) and showing a person in a wheelchair positioned to use the lavatory;

DETAILED DESCRIPTION OF THE PREFERRED EMBODIMENTS

Figure 1:
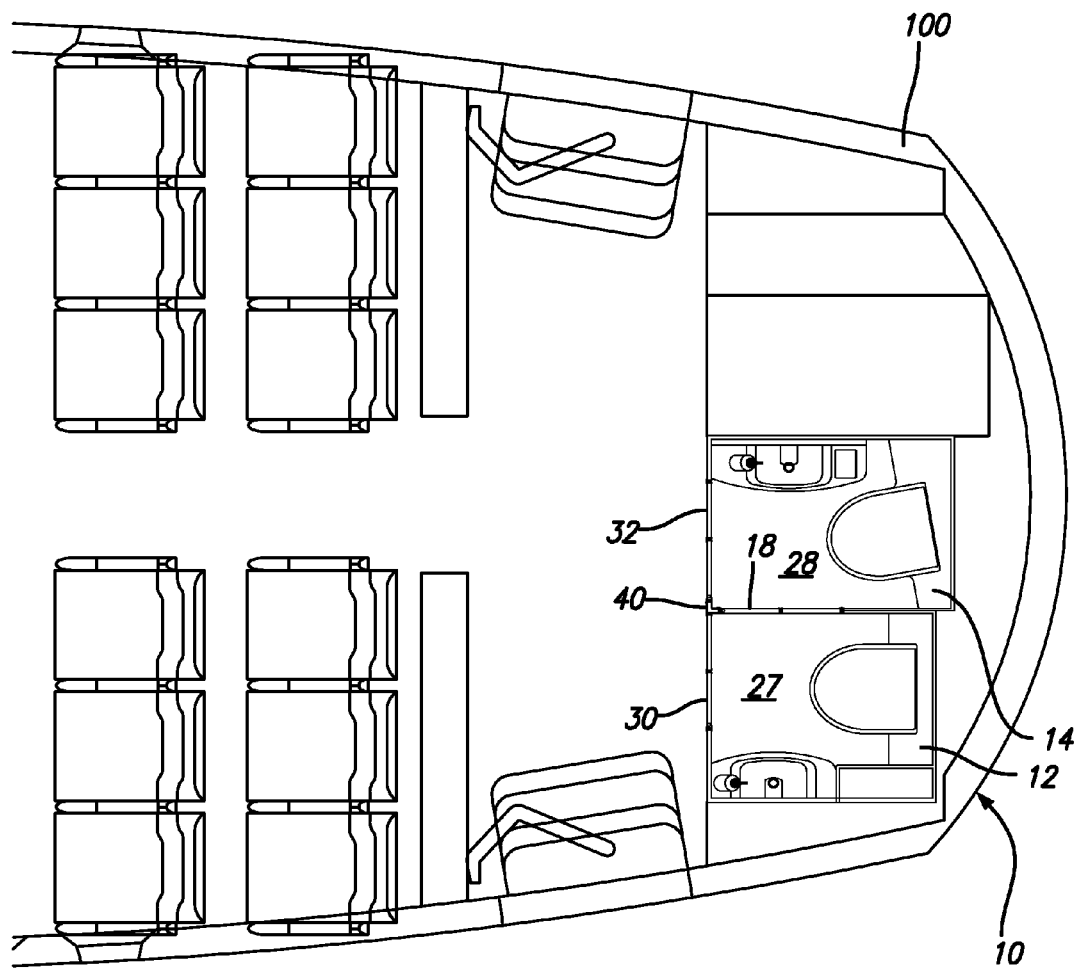
FIG. 1 shows an aircraft with a lavatory monument assembly disposed therein.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention. Furthermore, it will be appreciated that terms such as "aft," "forward," "inboard," "outboard," "left," and "right" are used as is typical in the aircraft industry and refer to the orientation of the lavatory monument assembly described herein as if it was positioned in an aircraft.

Referring now to the drawings, wherein the showings are for purposes of illustrating the present invention and not for purposes of limiting the same, FIGS. 1-21 show an embodiments of a lavatory monument assembly 10 that generally includes first and second lavatories 12 and 14 with a divider wall 16 there between and the ability to combine the two lavatory interior spaces by moving a divider door 18 to provide access for persons of reduced mobility (PRM) who are usually confined to a wheelchair.

In particular, the present invention is contemplated for use on commercial passenger aircraft 100, as shown in FIG. 1. However, this is not a limitation on the present invention and the lavatory assembly can be used elsewhere. The lavatory monument assembly 10 shown in the figures is configured to be positioned on the left or port side of an aircraft facing forward. However, it will be appreciated that a lavatory monument assembly that is a mirror image of the lavatory monument assembly 10 described herein and that is positioned on the right side of the aircraft facing forward is within the scope of the present invention. The lavatory monument assembly 10 can also be positioned such that it faces aft or such that it faces left or right when positioned within the aircraft. Any orientation or positioning of the aircraft is within the scope of the present invention.

In a preferred embodiment, the lavatory monument assembly 10 comprises an enclosure 20 that includes a plurality of walls and defines an enclosure interior 19. In many of the figures (e.g., FIGS. 2-17) the rear wall of the enclosure 20 is omitted. However, it will be appreciated that when the lavatory monument assembly 10 is positioned in an aircraft a rear wall will be included whether it be an integral part of the enclosure 20 (as shown in FIG. 18-21) or a separate wall (e.g., a wall of the aircraft). In general terms, the enclosure 20 includes a front wall 21, rear wall 22, and first and second side walls 24 and 26. The divider wall 16 extends between the front and rear walls 20 and 22 and includes the divider door 18, which is movable between a closed position and an open position, and, when in the closed position, divides the enclosure interior 19 into a first lavatory interior 27 and a second lavatory interior 28. The front wall 21 includes a first lavatory door 30 that is movable between an open and a closed position and provides access to the first lavatory interior 27 and a second lavatory door 32 that is movable between an open and a closed position and provides access to the second lavatory interior 28. It will be appreciated by those of skill in the art that the first and second lavatory doors 30 and 32 can be any type of door. For example, FIGS. 2-11 show the first and second lavatory doors 30 and 32 as single panel or blade doors and FIGS. 12-17 show the first and second lavatory doors 30 and 32 as double panel, bi-fold or flappy doors.

Figure 2:
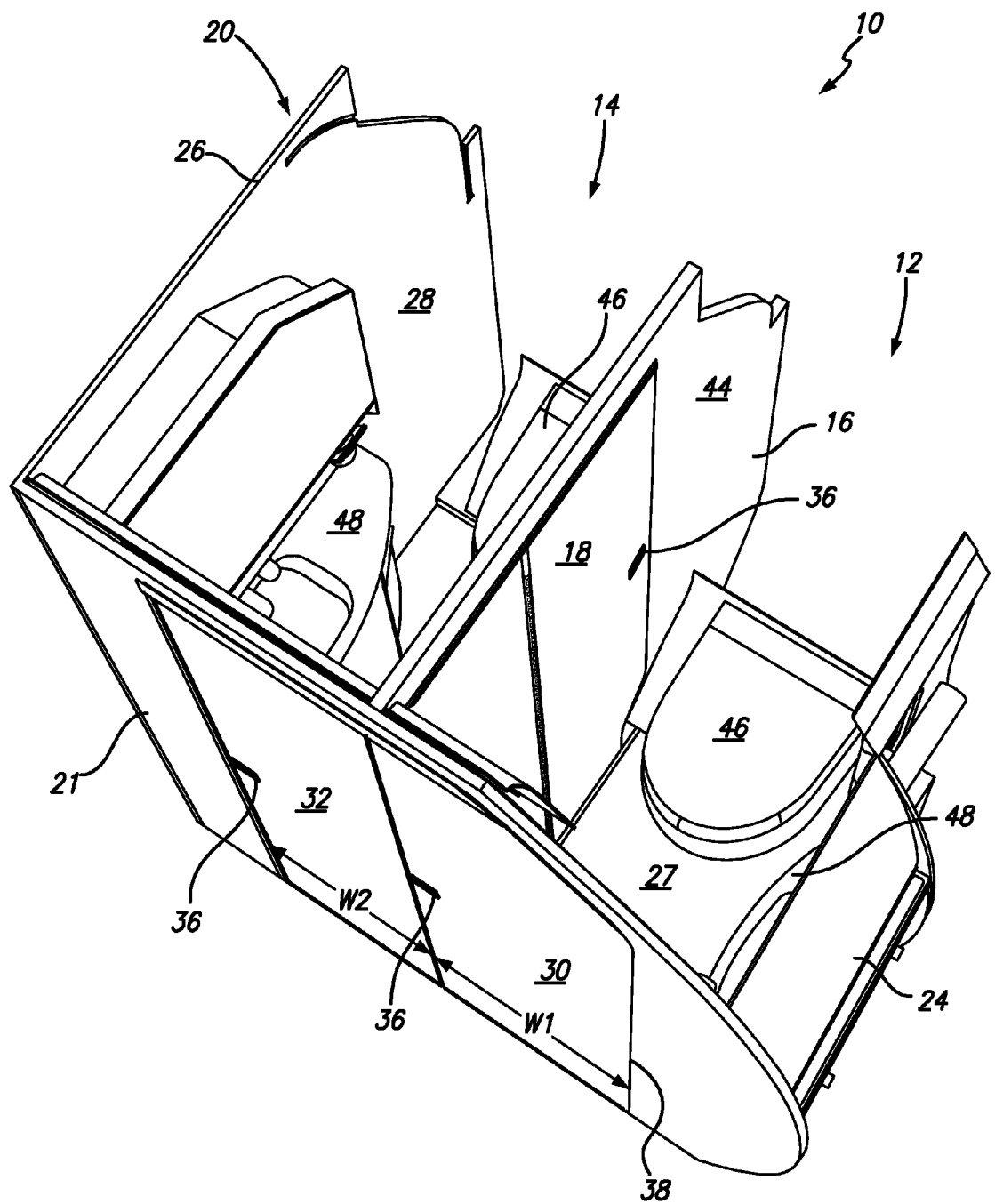
FIG. 2 is a perspective view of a lavatory monument assembly in accordance with a preferred embodiment of the present invention with the divider door in the closed position, the first lavatory door in the closed position and the second lavatory door in the closed position.
Figure 9:
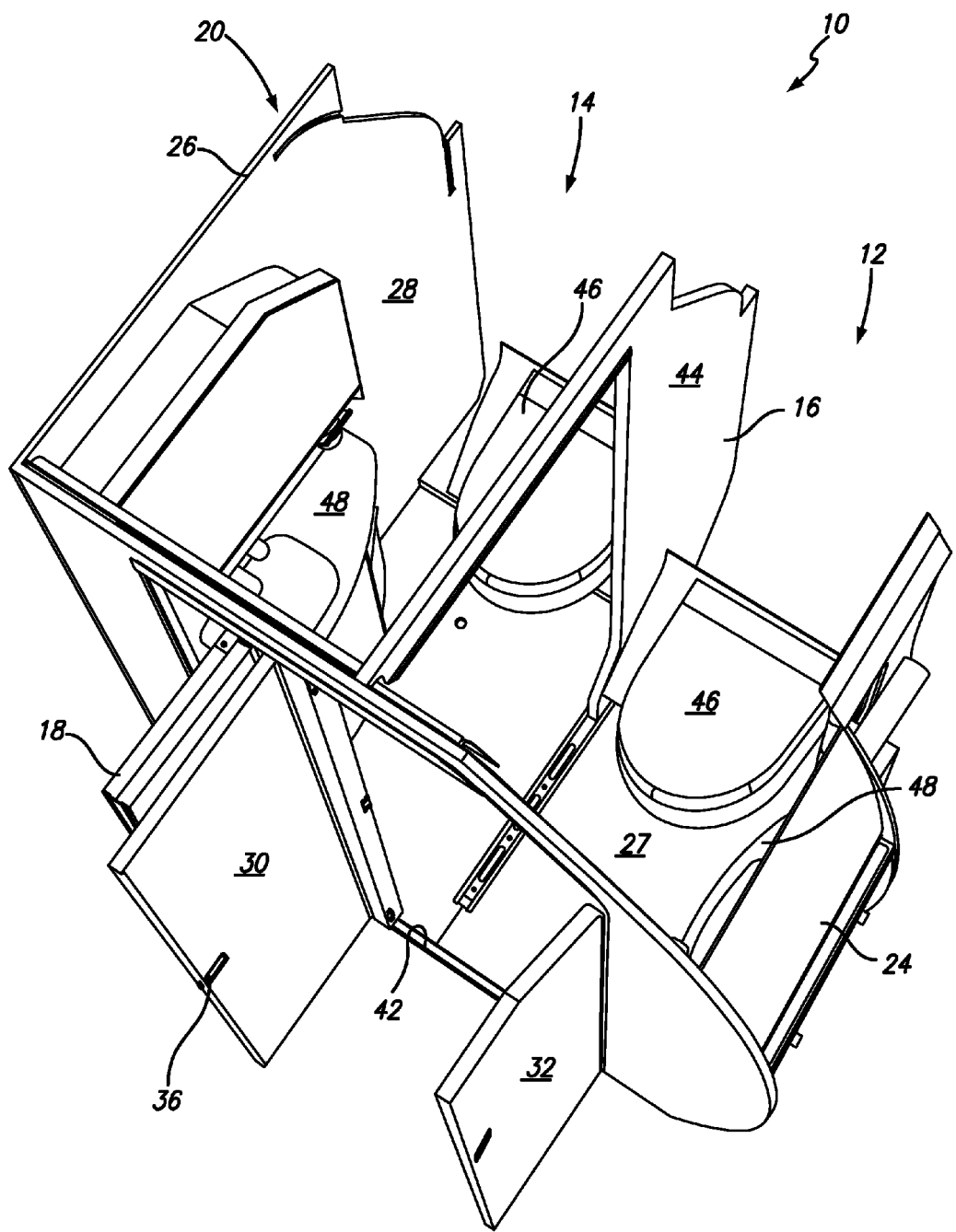
FIG. 9 is a perspective view of the lavatory monument assembly of FIG. 1 with the first lavatory door in the open position and the second lavatory door, divider door and center post slid to the left.
Figure 12:
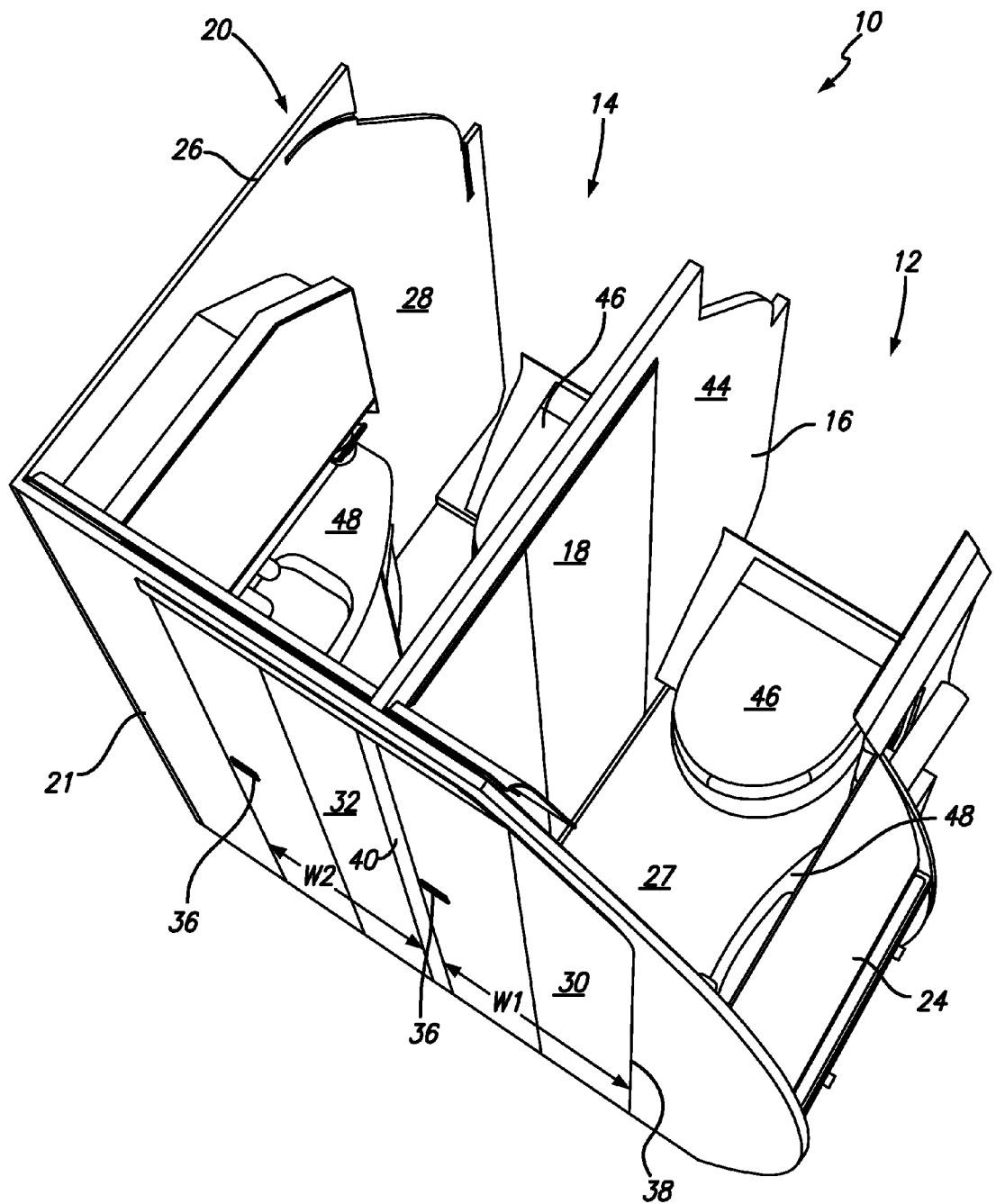
FIG. 12 is a perspective view of a lavatory monument assembly in accordance with a another preferred embodiment of the present invention with the divider door in the closed position, the first lavatory door in the closed position and the second lavatory door in the closed position.
Figure 17:
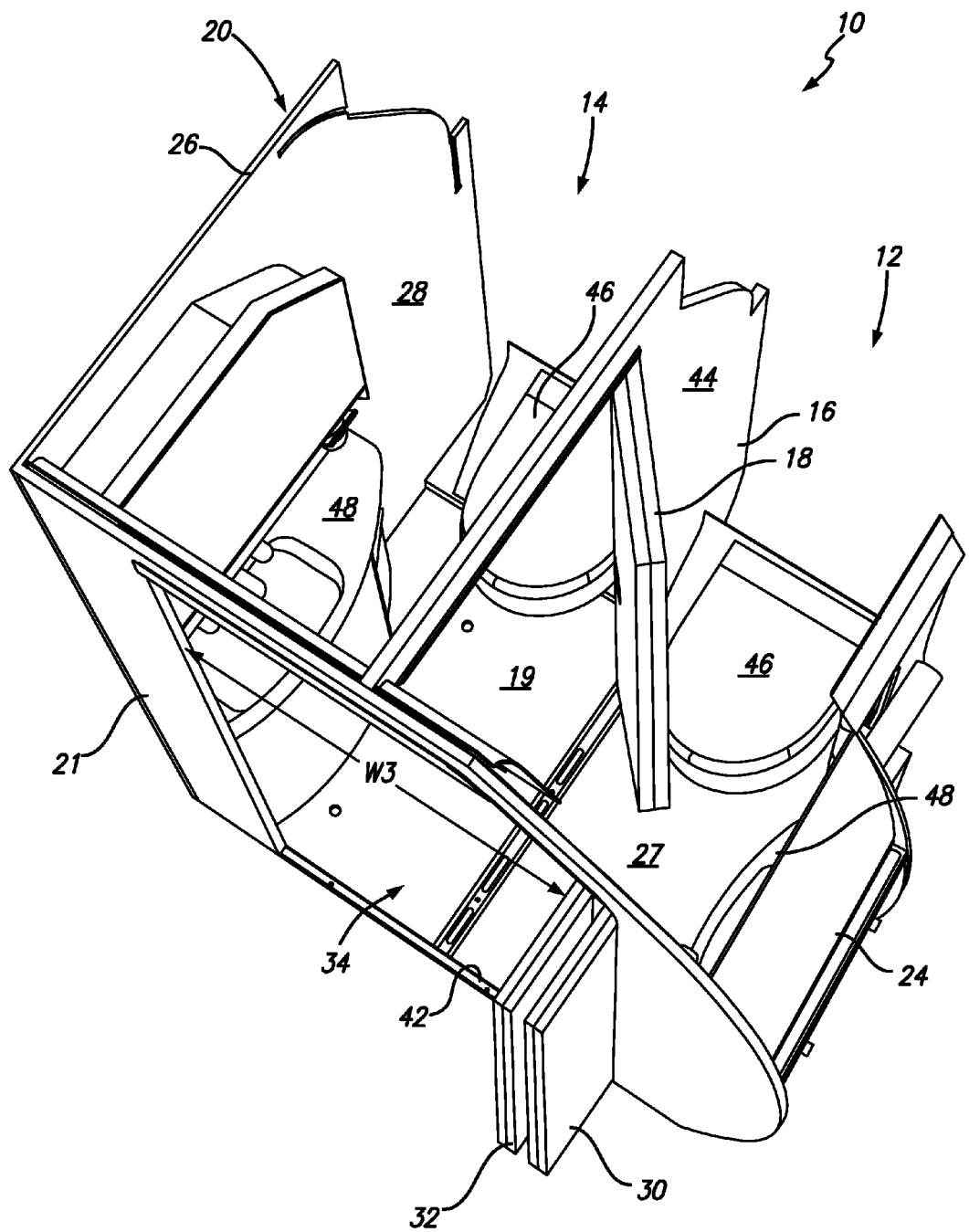
FIG. 17 is a perspective view of the lavatory monument assembly of FIG. 12 with the divider door in the open position, the first lavatory door in the open position and the second lavatory door and center post in the stowed position adjacent the first lavatory door.
Figure 18:
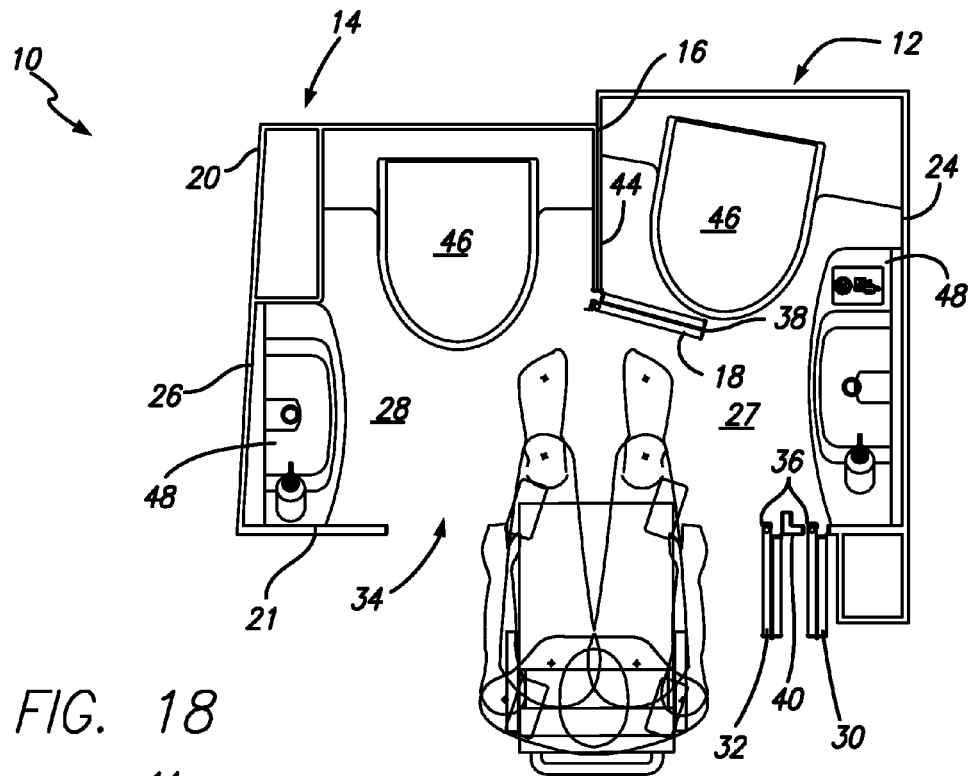
FIG. 18 is a top plan view of the lavatory monument assembly of FIG. 12 in the combined lavatory configuration and showing a person in a wheelchair entering the front opening.
Figure 19:
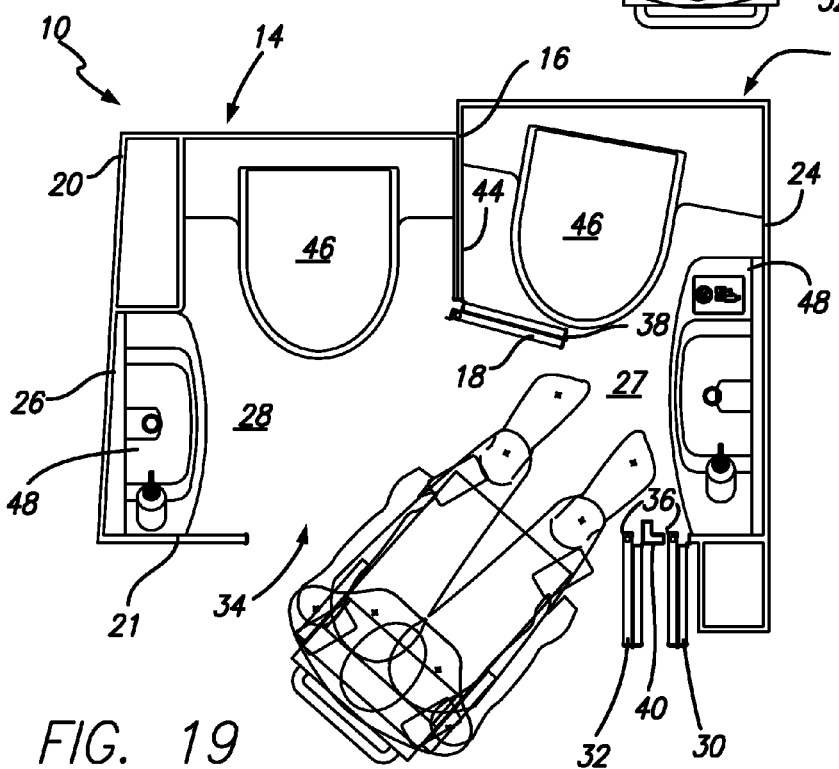
FIG. 19 is a top plan view of the lavatory monument assembly of FIG. 12 in the combined lavatory configuration and showing a person in a wheelchair positioning himself within the enclosure interior.
Figure 22:
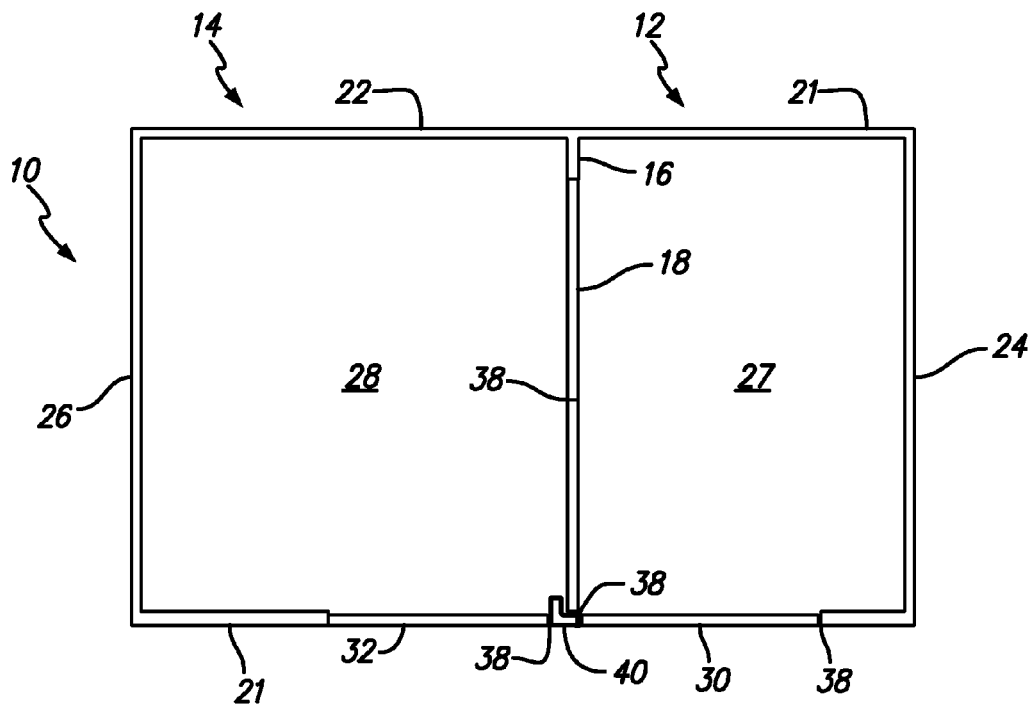
FIG. 22 is a top plan view of a lavatory monument assembly in accordance with a another preferred embodiment of the present invention with the divider door in the closed position, the first lavatory door in the closed position and the second lavatory door in the closed position.

As is shown in FIGS. 2 and 12, when the divider door 18 is in the closed position, the first and second lavatories 12 and 14 are separate. In this configuration (the "separate lavatory" configuration), the first and second lavatories 12 and 14 are usable separately and the first lavatory 12 is accessible by the first lavatory door 30 and the second lavatory 14 is accessible by the second lavatory door 32. As is shown in FIGS. 9 and 17, when the divider door 18, first lavatory door 30 and second lavatory door 32 are all in the open position (the "combined lavatory" configuration), the opening 34 provided in the front wall 21 is large enough to provide access to a person in a wheelchair. To change from the separate lavatory configuration to the combined lavatory configuration each of the divider door 18, first lavatory door 30 and second lavatory door 32 are all moved from the closed position to the open position. This can be done in any desired order. More specific embodiments and process steps are provided below.

It will be appreciated that all of the doors include latches, handles and/or locks, etc. as are known in the art. For example, see latches 36 (or release bolt locks or the like) on all three of the doors in the figures. Furthermore, hinges are included where necessary to allow doors to open or fold, as desired. For example, see hinge 38 that allows the divider door 18 to fold, and hinges 38 that allow the first lavatory door 30, second lavatory door 32 and divider door 18 to open. A detailed description of the latches, locks, etc. are omitted as these components are known in the art.

Figure 4:
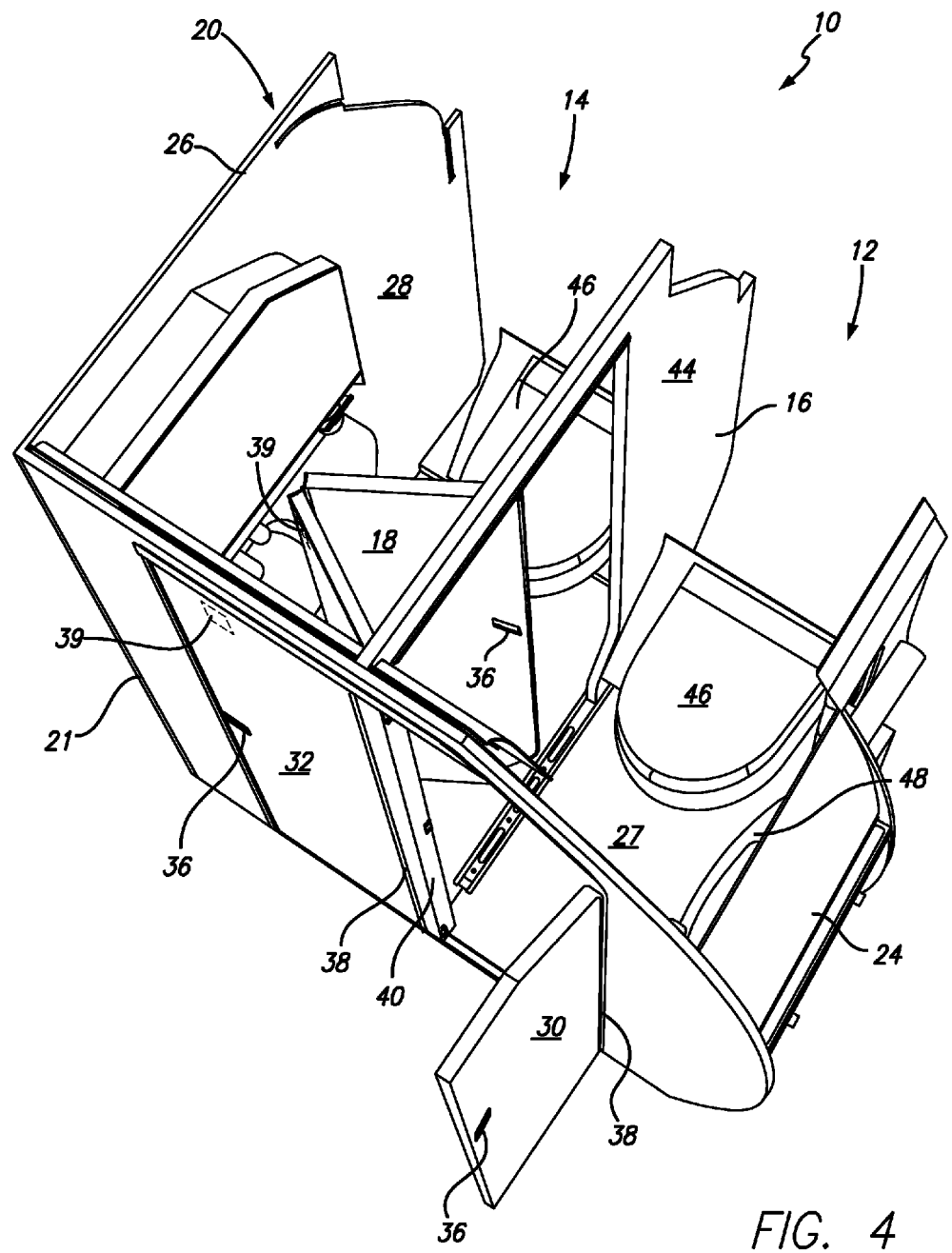
FIG. 4 is a perspective view of the lavatory monument assembly of FIG. 1 with the divider door partially open, the first lavatory door in the open position and the second lavatory door in the closed position.

In a preferred embodiment, the divider door includes spring hinges so that when the divider door 18 is unlatched by a user it at least partially opens on its own. However, this is not a limitation on the present invention and a non-spring hinge can be used. Divider door 18 can be a bi-fold door as shown in the figures and can slide within a track or not. However, any type of door is within the scope of the present invention. For example, divider door 18 can be a blade door that is hinges open or slides into a recess. In a preferred embodiment components are included that secure divider door 18 to second lavatory door 32 in the configuration shown in FIGS. 5-11. For example, magnets, Velcro, latches, hooks, etc. can be used. FIG. 4 shows magnets 39 on the divider door 18 and the second door 32. It will be appreciated that the magnets 39 are strong enough to hold the divider door 18 against or adjacent to the second door 32 during operation, but also make it easy enough for a user to separate the divider door 18 from the second door 32 after using the lavatory.

Figure 5:
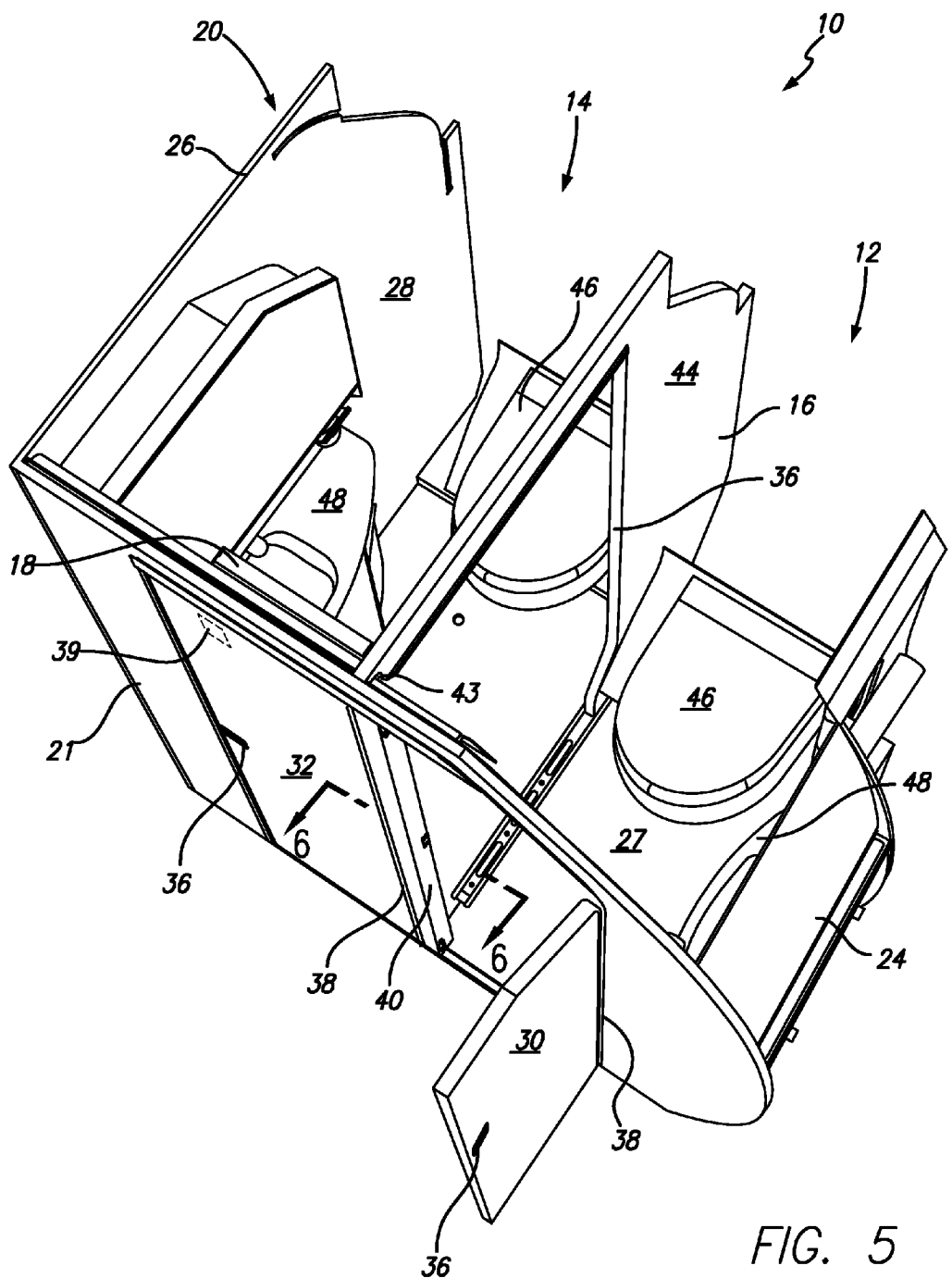
FIG. 5 is a perspective view of the lavatory monument assembly of FIG. 1 with the divider door in the open position, the first lavatory door in the open position and the second lavatory door in the closed position.
Figure 6:
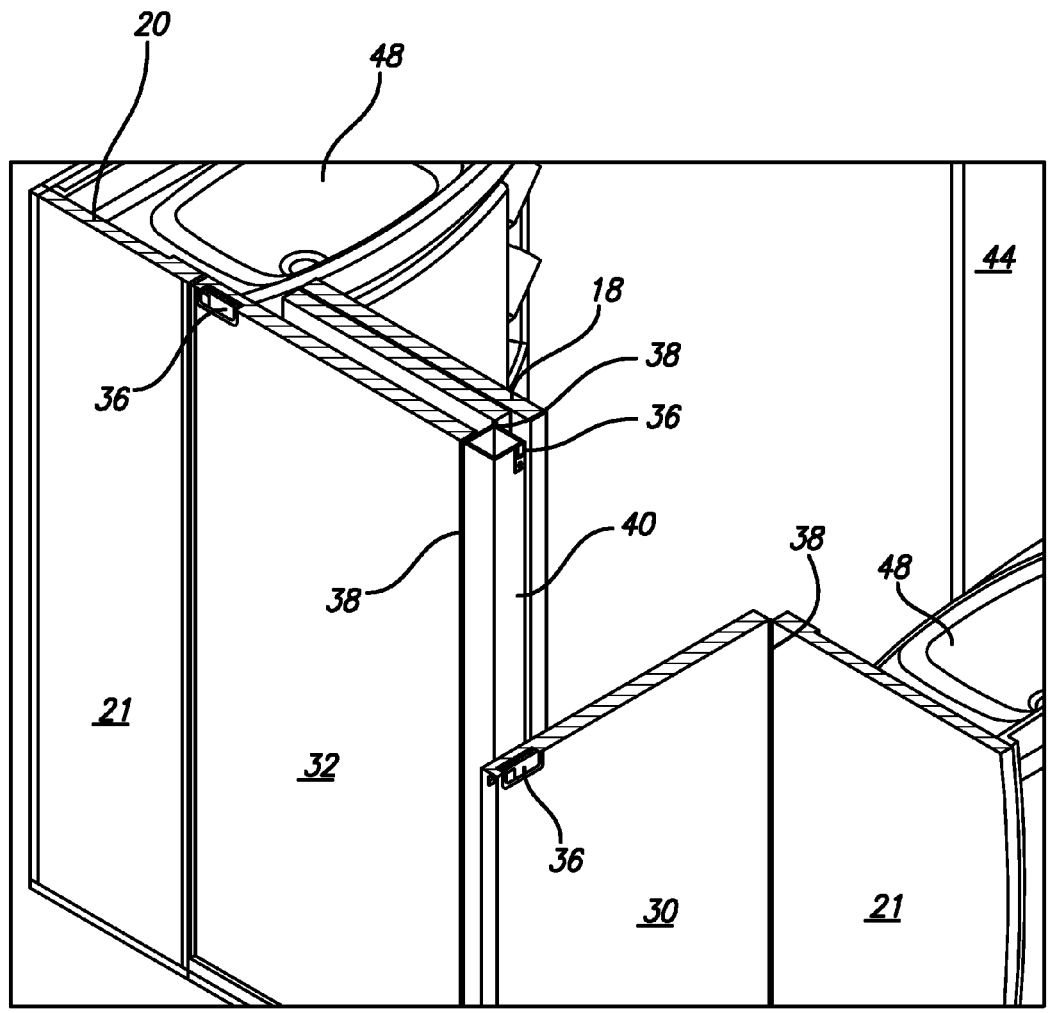
FIG. 6 is a cross-sectional perspective view taken along line 6-6 of FIG. 5.

As shown in FIGS. 2-11, in a preferred embodiment, the front wall 21 also includes a vertically extending center post 40. As shown in FIG. 6, in a preferred embodiment, both the second lavatory door 32 and the divider door 18 are hingedly connected to the center post 40. The center post 40 preferably is slidable within tracks 42 at the top and bottom thresholds, as is shown in FIG. 9. Any type of track and associated roller, slider, glider, spring loaded post or the like is within the scope of the present invention. For example, in an embodiment, the door thresholds can include stainless steel rails. The top portion can include a nylon guider that is received in the rail and the bottom portion can include a nylon guider or an "I" shaped member that is received in the rail.

In a preferred embodiment, a latch or the like is located at the top or bottom of the center post 40 that allows a person using the lavatory to release the center post 40 so that they can slide it to the left (or right in another embodiment). Any type of latch or the like for securing the center post 40 during normal lavatory operation is within the scope of the present invention, e.g., a hook and keeper, spring loaded post, bolt latch, handle, switch, magnets, lever, bolt lock, Velcro, etc. As shown in FIG. 5, in a preferred embodiment, the lavatory monument assembly 10 includes a release 43 that is positioned on the center post 40 and extends upwardly to the divider wall 16 (or vice versa) that is movable between a latched and unlatched position. In the latched position the center post 40 cannot move in the tracks and in the unlatched position the center post 40 is slidable. In another embodiment, the release can be omitted and the center post 40 can be slidable once the divider door 18 is moved to the open position.

As shown in FIG. 9, in a preferred embodiment, because the second lavatory door 32 and divider door 18 are both hingedly connected to the center post 40 all three components slide together to a stowed position which, together with the open first lavatory door 30 provides a large opening 34 for a wheelchair to fit through. It will be understood that the center post 40 (and any components connected, secured or hinged thereto) is slidable between a home position and the stowed position.

The preferred embodiment shown in FIGS. 12-17, also includes a center post 40. However, in this embodiment, only the second lavatory door 32 is hingedly connected to the center post 40 as the divider door 18 folds toward the back of the enclosure 20 and is hingedly connected to a rear portion 44 of the divider wall 16. In another embodiment, the center post 40 can move with the first or second lavatory door 30 or 32 when the door is opened. In this embodiment, both doors open toward the outside of the enclosure 20.

Figure 10:
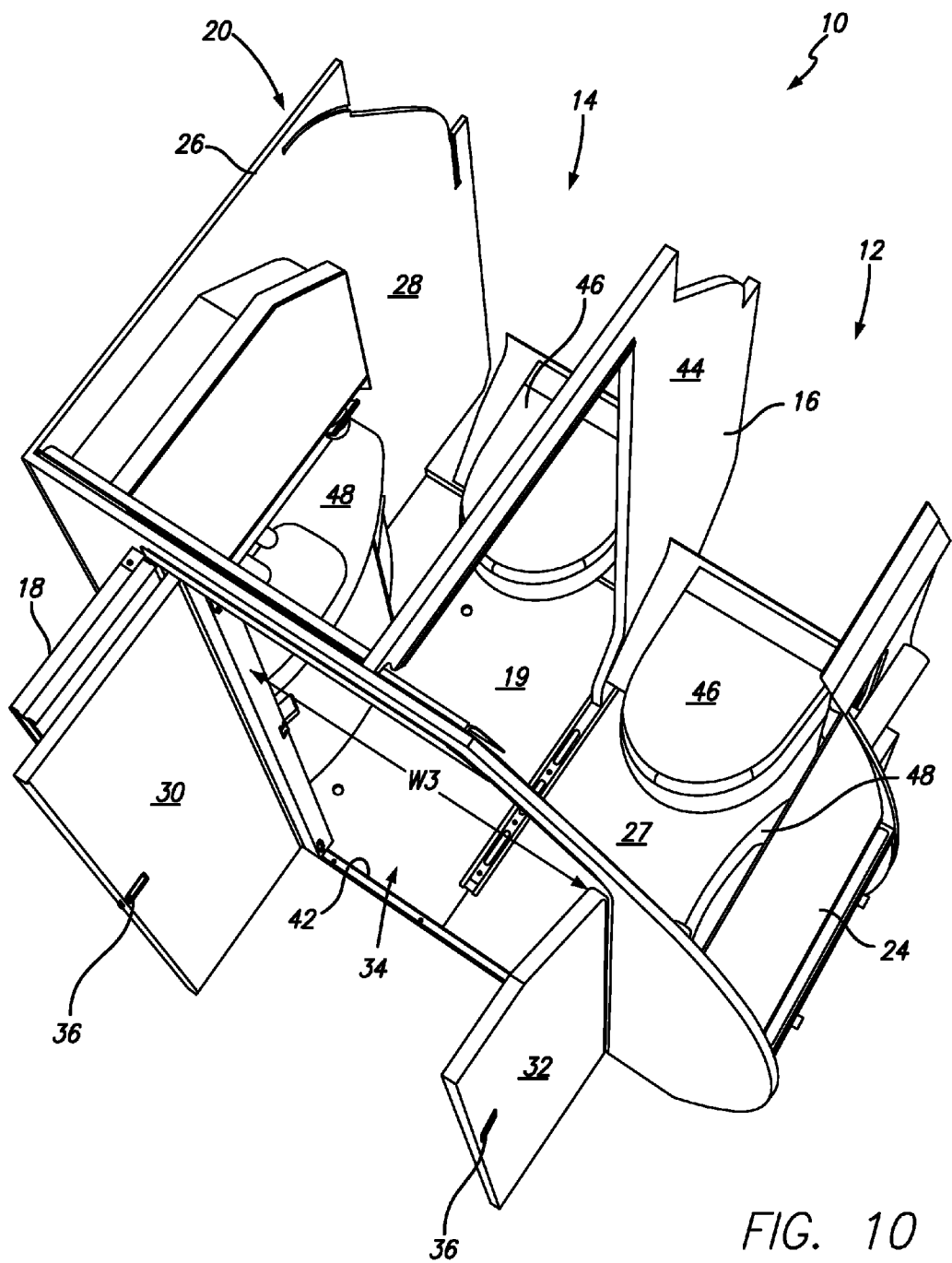
FIG. 10 is a perspective view of the lavatory monument assembly of FIG. 1 with the first lavatory door in the open position and the second lavatory door, divider door and center post in the stowed position.

Generally, and as shown in FIGS. 2 and 12 the first lavatory door 30 defines a first width W1 and the second lavatory door 32 defines a second width W2. When the first and second lavatory doors 30 and 32 are in the open position, the opening 34 defines a third width W3 (as shown in FIGS. 10 and 17) that is larger than the first width W1 and is larger than the second width W2.

As shown in the figures, the lavatory monument assembly 10 preferably includes toilets 46, sinks 48 and other components typically present in aircraft lavatories. However, none of these components are limitations on the present invention. As shown best in FIGS. 18-21, in a preferred embodiment, the toilet 46 in the first lavatory is offset such that a line that bifurcates the toilet is not parallel to the side walls 24 and 26. However, this is not a limitation on the present invention.

Figure 3:
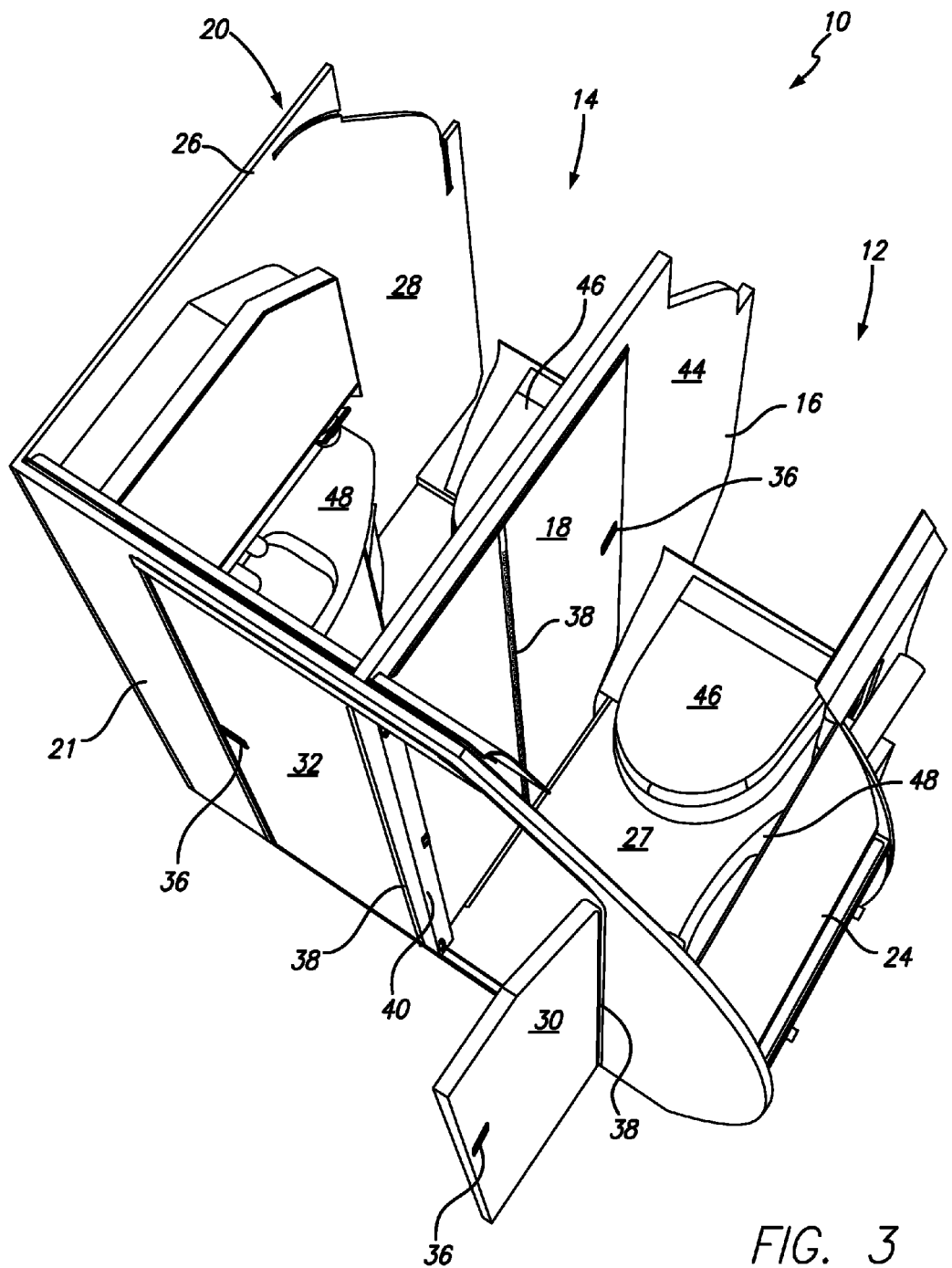
FIG. 3 is a perspective view of the lavatory monument assembly of FIG. 1 with the divider door in the closed position, the first lavatory door in the open position and the second lavatory door in the closed position.
Figure 7:
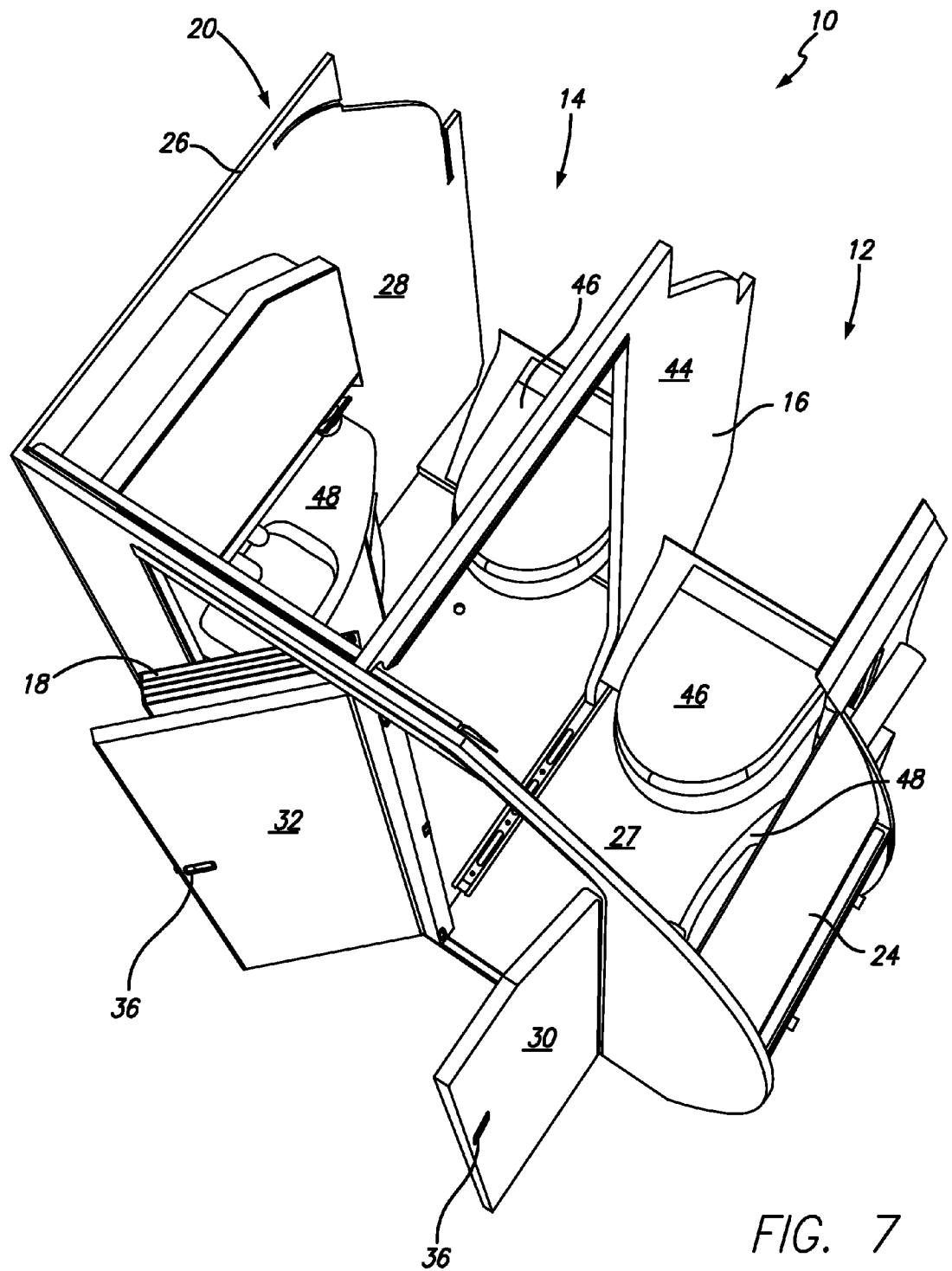
FIG. 7 is a perspective view of the lavatory monument assembly of FIG. 1 with the first lavatory door in the open position and the second lavatory door partially open with the divider door secured thereto.
Figure 8:
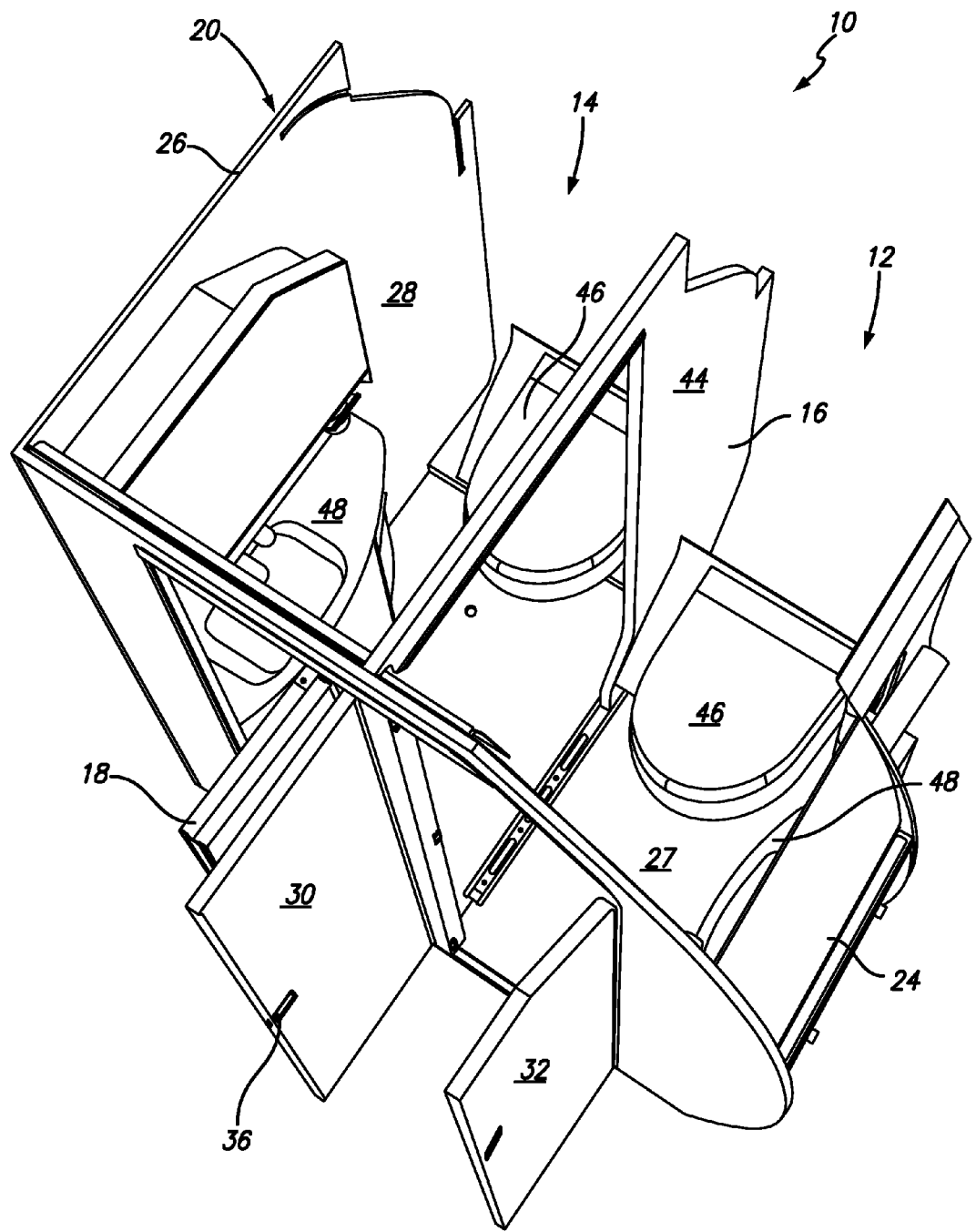
FIG. 8 is a perspective view of the lavatory monument assembly of FIG. 1 with the first lavatory door in the open position, the second lavatory door in the open position with the divider door secured thereto, and the center post in the home position.
Figure 11:
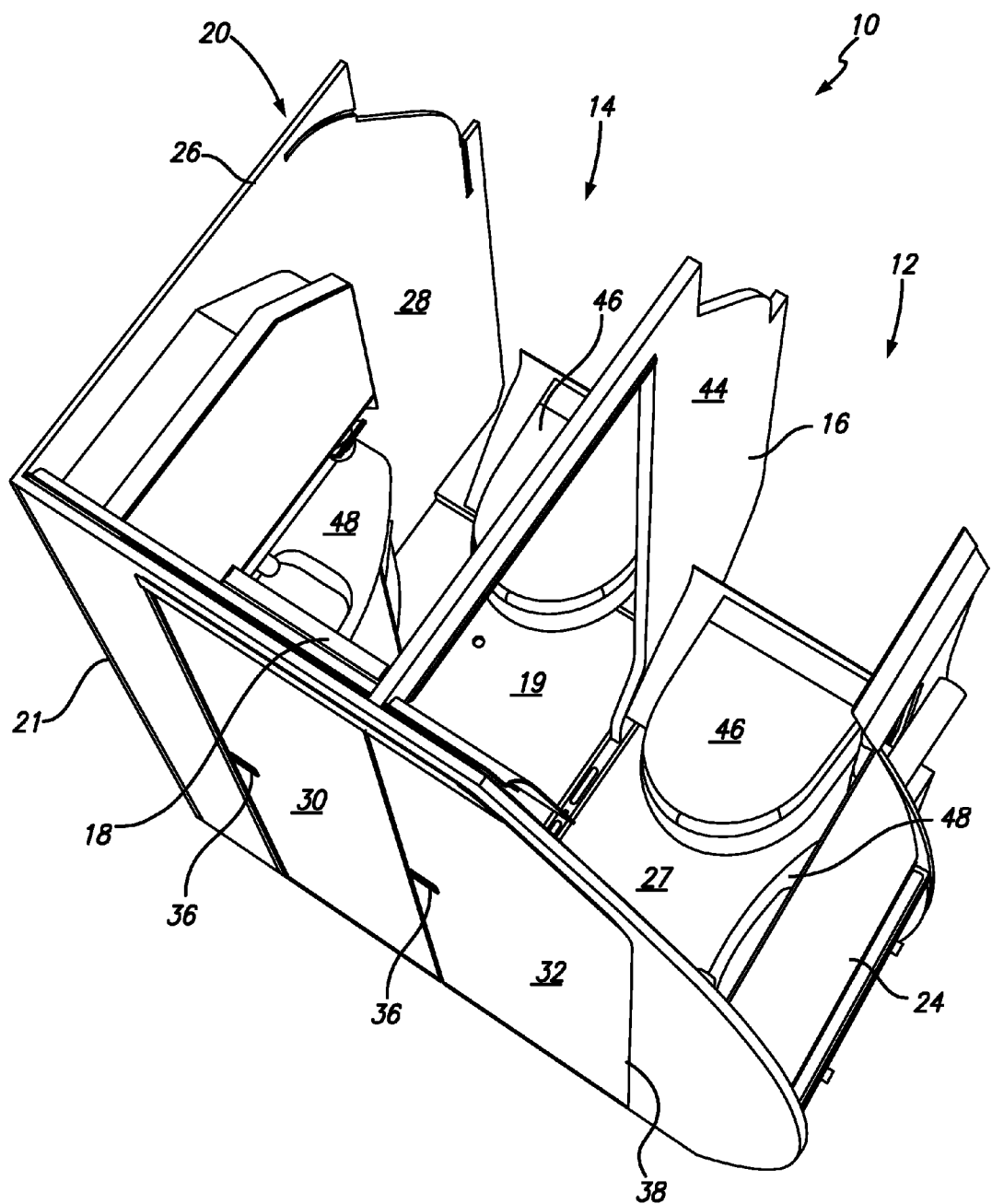
FIG. 11 is a perspective view of the lavatory monument assembly of FIG. 1 with the first lavatory door in the closed position, the second lavatory door in the closed position and the divider door in the open position.

An exemplary method of using or operating the lavatory monument assembly 10 shown in FIGS. 2-11 will now be described. FIG. 2 shows the lavatory monument assembly with all the doors closed. The first lavatory door 30 is unlatched and opened, as is shown in FIG. 3. The divider door 18 is then unlatched and opened, as is shown in FIGS. 4 and 5. As is shown in FIG. 5, the divider door 18 is positioned against or adjacent second lavatory door 32. Next, the second lavatory door 32 is unlatched and opened together with the divider door 18, as shown in FIGS. 7-8. The center post 40 is then unlatched and slid to the left (inboard in this example), as is shown in FIG. 9, until it is reaches the stowed position, as is shown in FIG. 10. At this point, the PRM enters the enclosure interior 19, slides the center post 40 back to the home position and closes the first and second lavatory doors 30 and 32, as is shown in FIG. 11.

In another embodiment, bi-fold doors can be used for this same configuration (where the divider door 18 is hingedly connected to the center post 40). In another embodiment, in the stowed position (FIG. 10), the second lavatory door 32 can close to the right and the first and second lavatory doors 30 and 32 can be secured to one another. This prevents the PRM from having to slide the center post 40 back to the home position to use the lavatory. It will be appreciated that the latch 36 on the divider door 18 can be placed on the second lavatory side and the above method can be changed so that the second lavatory door 32 is opened first. In another embodiment, the divider door 18 can be unlatchable from both sides. In another embodiment, the divider door 18 is foldable toward the back of the enclosure 20 (similar to the embodiment shown in FIGS. 12-17).

Figure 13:
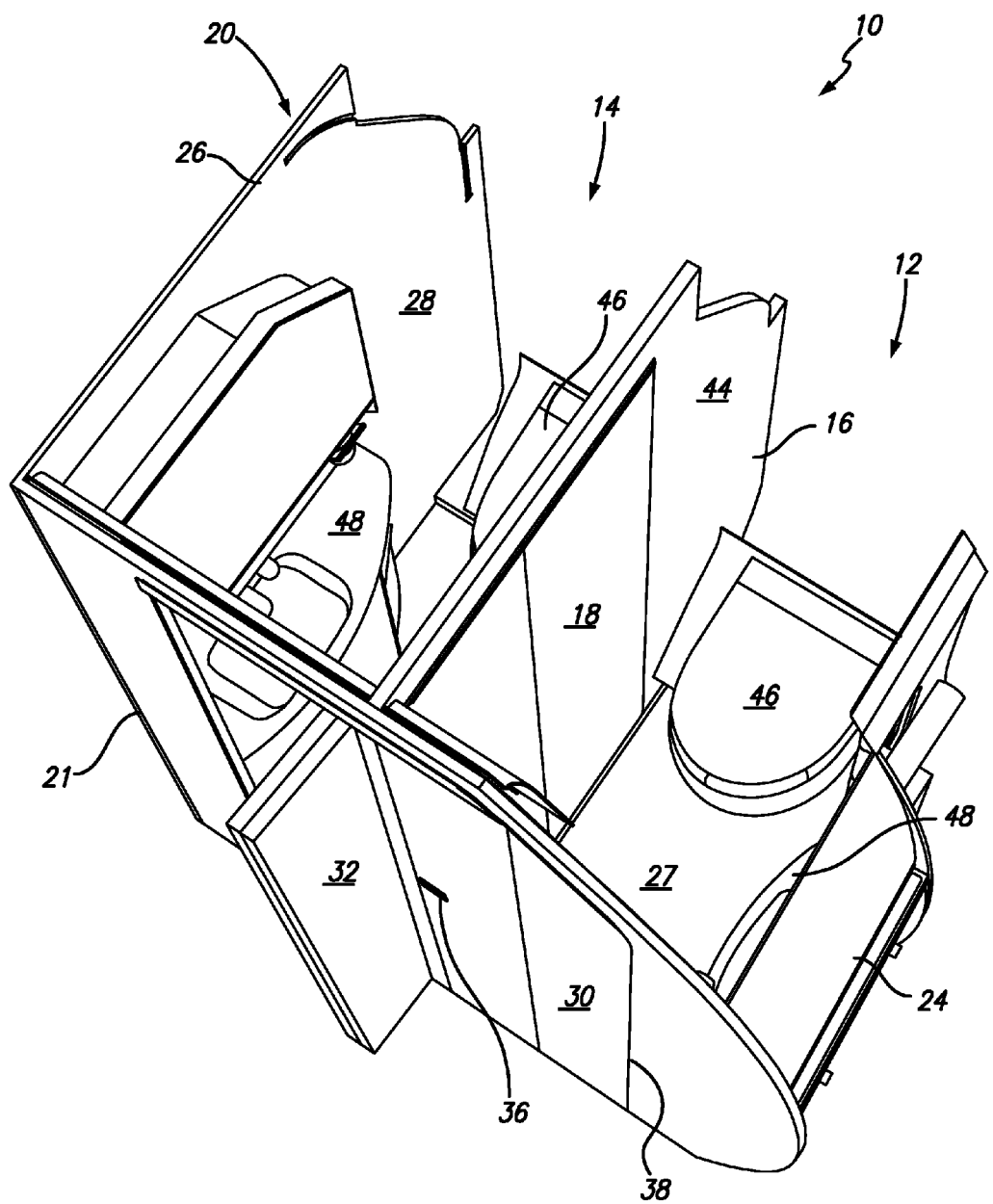
FIG. 13 is a perspective view of the lavatory monument assembly of FIG. 12 with the divider door in the closed position, the first lavatory door in the closed position and the second lavatory door in the open position.
Figure 14:
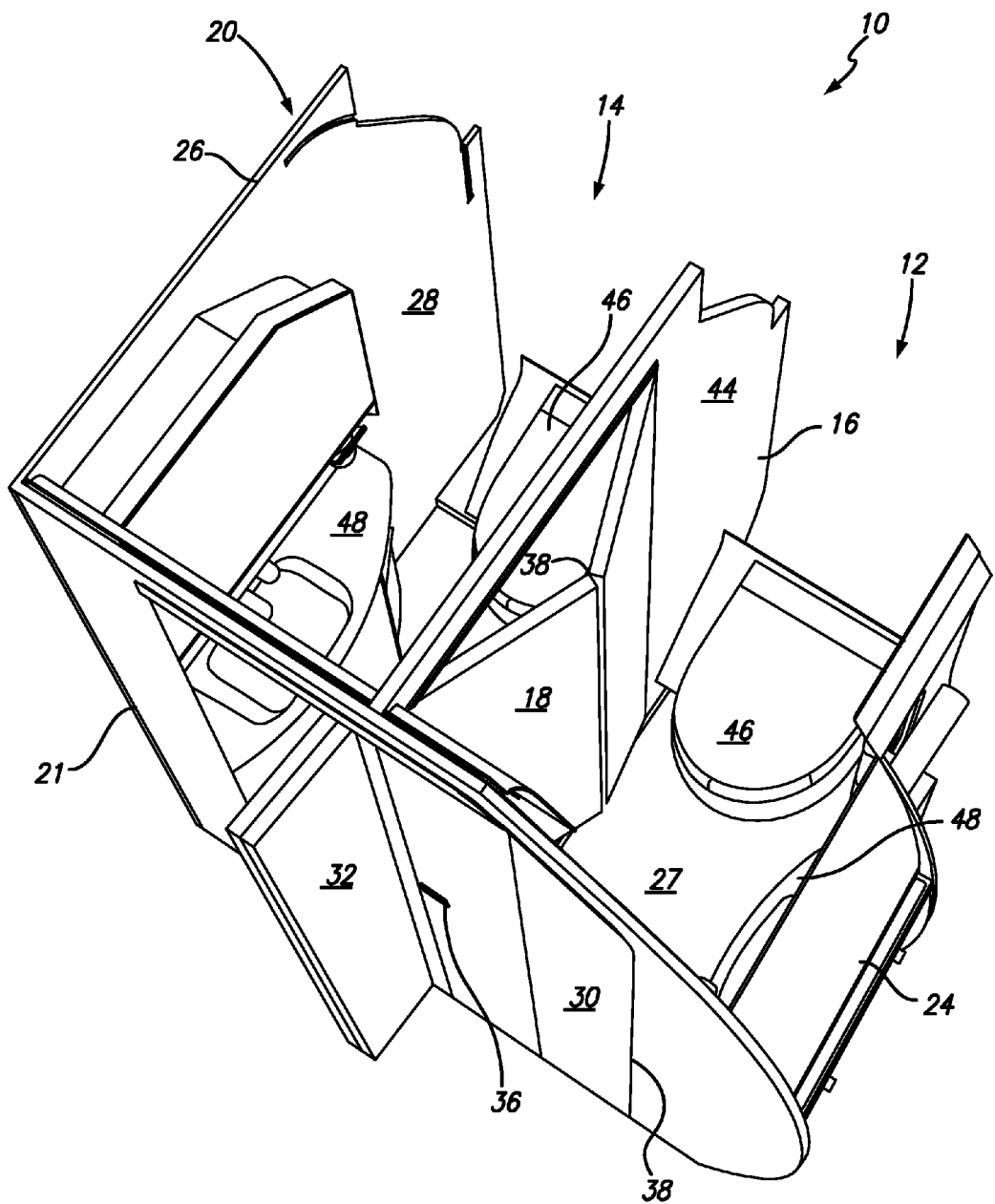
FIG. 14 is a perspective view of the lavatory monument assembly of FIG. 12 with the divider door partially open, the first lavatory door in the closed position and the second lavatory door in the open position.
Figure 15:
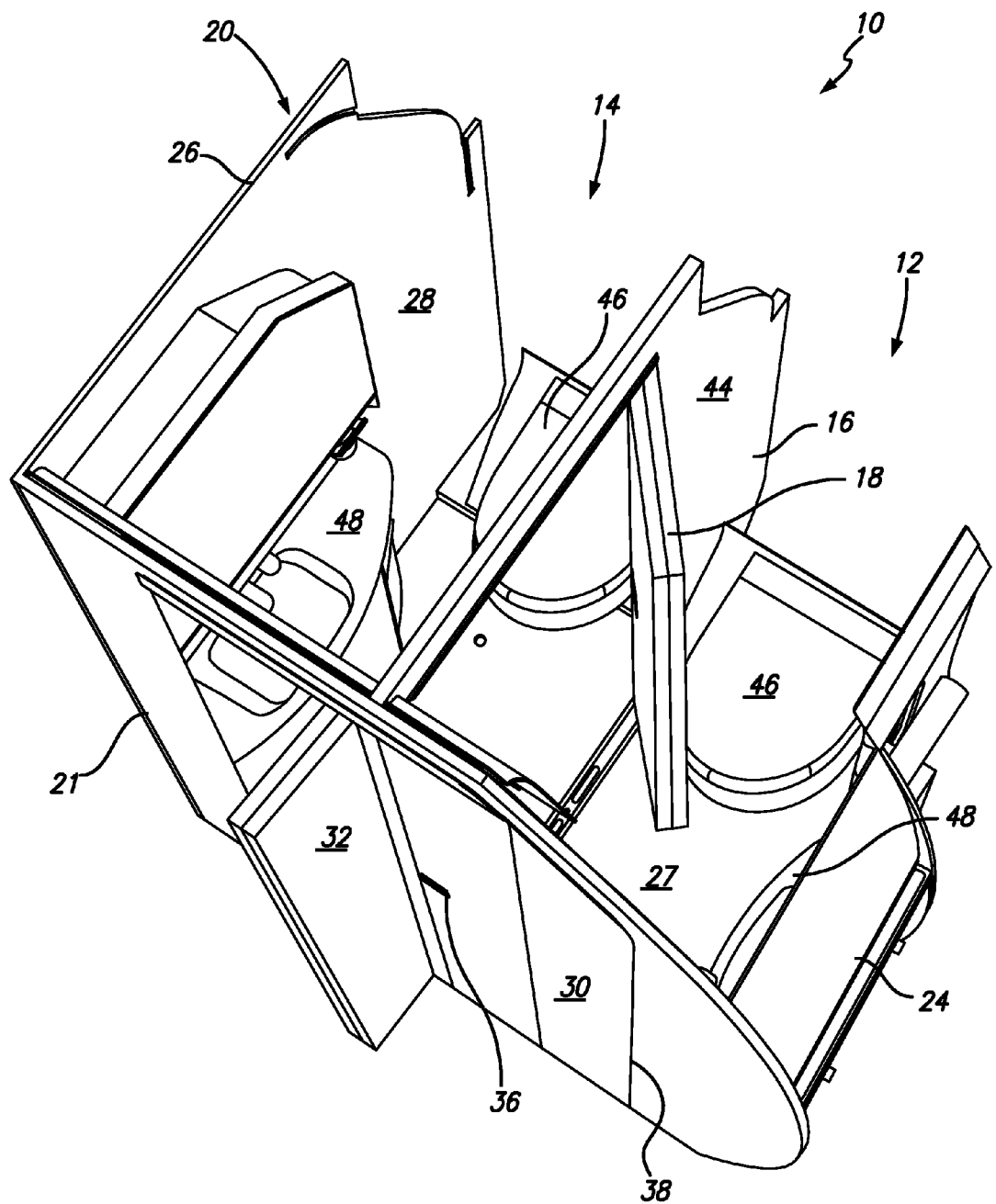
FIG. 15 is a perspective view of the lavatory monument assembly of FIG. 12 with the divider door in the open position, the first lavatory door in the closed position and the second lavatory door in the open position.
Figure 16:
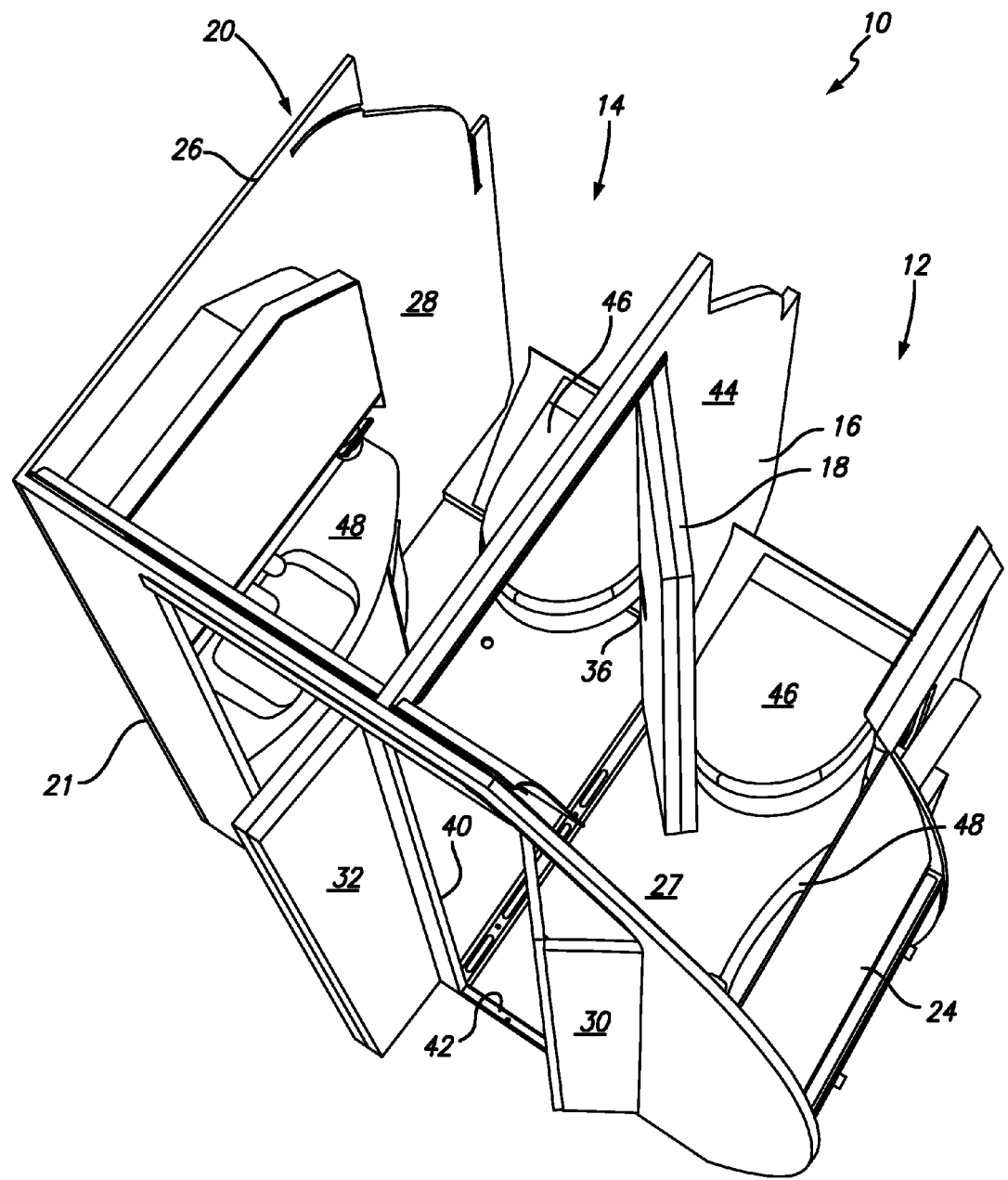
FIG. 16 is a perspective view of the lavatory monument assembly of FIG. 12 with the divider door in the open position, the first lavatory door partially open and the second lavatory door in the open position.

An exemplary method of using or operating the lavatory monument assembly 10 shown in FIGS. 12-17 will now be described. FIG. 12 shows the lavatory monument assembly with all the doors closed. The second lavatory door 32 is unlatched and opened, as is shown in FIG. 13. The divider door 18 is then unlatched and opened, as is shown in FIGS. 14-15. As is shown in FIG. 15, the divider door 18 is positioned against or adjacent the toilet 46 in the first lavatory 12. In a preferred embodiment components are included that hold the divider door 18 in this configuration. However, this is not a limitation on the present invention. Next, the first lavatory door 30 is unlatched and opened, as shown in FIG. 16. The center post 40 is then unlatched and slid to the right (outboard in this example) until it is reaches the stowed position, as is shown in FIG. 17. At this point, the PRM enters the enclosure interior 19, slides the center post 40 back to the home position and closes the first and second lavatory doors 30 and 32, as is shown in FIG. 21.

It will be appreciated that the latch 36 on the divider door 18 can be placed on the first lavatory side and the above method can be changed so that the first lavatory door 30 is opened first. In another embodiment, the divider door 18 can be unlatchable from both sides. In another embodiment, the divider door 18 is foldable toward the front of the enclosure 20 (similar to the embodiment shown in FIGS. 2-11).

In another embodiment, both the first and second lavatory doors 30 and 32 can be hinged to the center post 40 and can be slidable therewith. In yet another embodiment, the first and second lavatory doors 30 and 32 and the divider door 18 can all be hinged to the center post 40 and can be slidable therewith.

An exemplary method of a person using the lavatory monument assembly 10 in the combined lavatory configuration is shown in FIGS. 18-21. In a preferred embodiment, the person performs the methods described above to place the lavatory monument assembly 10 in the combined lavatory configuration, and then, as is shown maneuvers into the enclosure interior 19 exits the wheelchair, places the wheelchair outside the enclosure 20 and then closes the first and second lavatory doors 30 and 32 to use the lavatory.

FIGS. 22-28 show another embodiment of a lavatory monument assembly 10 that includes a door system that opens to allow access for a PRM. In this embodiment, the second lavatory door 32 is positioned outboard and the first lavatory door 30 is positioned inboard in the aircraft. Also in this embodiment, the first and second lavatory doors 30 and 32 are blade doors and the divider door 18 is a bi-fold door. In a preferred embodiment, the first lavatory door 30 is hinged to the enclosure 17 (at the front wall 21) on the inboard side and opens inboard towards the center of the aircraft. The first lavatory door 30 can be any size and material. In an exemplary embodiment, the first lavatory door 30 is 19½" and 74" tall, is made of a ¾" thick composite panel and is capped all around with aluminum u-shaped trims with the exception of a mortise hinge 38 on the inboard vertical edge.

The second lavatory door 32 is hinged to the center post 40 on the inboard side and opens inboard towards the center of the aircraft. In an exemplary embodiment, the second lavatory door 32 is 17½" wide and 74" tall, is made of a ¾" thick composite panel and is capped all around with aluminum u-shaped trims with the exception of a mortise hinge 38 on the inboard vertical edge.

The divider door 18 is preferably positioned normal to the first and second lavatory doors 30 and 32 and is hinged at the center post 40 on the inboard side and when unlatched is spring loaded to collapse or fold towards the front wall 21. The bi-fold door includes two blades one forward and one aft that share a common mortise hinge 38. The forward blade.

In a preferred embodiment, the center post 40 is a structural beam that supports the second lavatory door 32 and the divider door 18. Generally, it provides a hinge location for the second lavatory door 32 and the divider door 18a and allows for the second lavatory door 32 and the divider door 18 to slide inboard in order to convert the first and second lavatories 12 and 14 into a single larger lavatory that is accessible by a disables person. In a preferred embodiment, the center post 40 is an L-Shaped post with integrated mortise hinges. The post can be made of, for example, an aluminum extrusion. In an exemplary embodiment, at the top of the center post 40 is attached a set of linear bearings that allow the center post 40 to slide inboard and outboard, and at the bottom of the center post 40 is a roller wheel guide that allows the center post 40 to move along the track 42.

Figure 23:
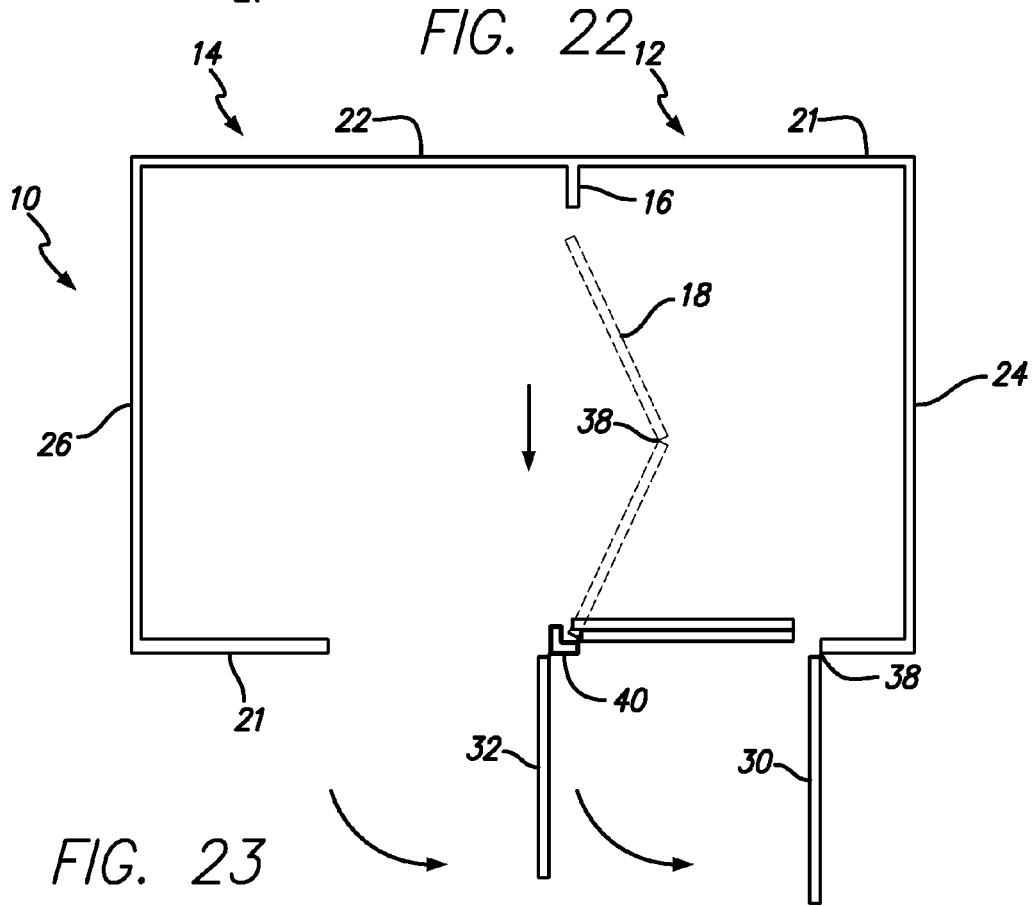
FIG. 23 is a top plan view of the lavatory monument assembly of FIG. 22 with the divider door in the open position, the first lavatory door in the open position and the second lavatory door in the open position.

An exemplary method of using or operating the lavatory monument assembly 10 shown in FIGS. 22-28 will now be described. FIG. 23 shows the lavatory monument assembly with all the doors closed. The second lavatory door 32 is unlatched and opened, as is shown in FIG. 23. In a preferred embodiment, components, such as a latch, lock, magnets, etc. are provided to secure the second lavatory door 32 in the open position. Next, the first lavatory door 30 is unlatched and opened, as is shown in FIG. 23. In a preferred embodiment, components, such as a latch, lock, magnets, etc. are provided to secure the first lavatory door 30 in the open position. The user now enters the enclosure interior 19 through the second lavatory door space and unlocks/unlatches the divider door 18. In another embodiment, the user can enter through the first lavatory door space if the latch 36 is provided on the opposite side of the divider door 18. The divider door 18 is then collapsed/folded in the forward direction until the two halves meet and are secured together (e.g., by a magnetic catch), as is shown in FIG. 23.

Figure 24:
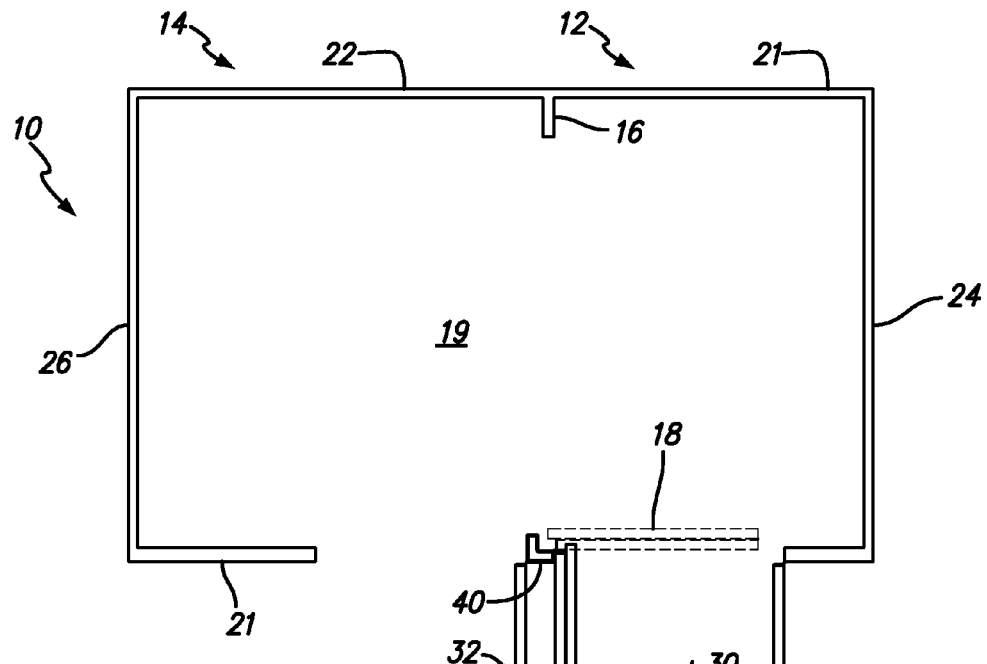
FIG. 24 is a top plan view of the lavatory monument assembly of FIG. 22 with the first lavatory door in the open position and the center post in the home position with the divider door and the second lavatory door secured together.

Once the divider door 18 halves are secured together and are normal to the flight direction, the divider door 18 is pivoted forward about the forward-most hinge 38 on the center post 40 until the two halves of the divider door 18 are parallel to the second lavatory door 32, as is shown in FIG. 24. In a preferred embodiment, a clasp 51 is provided to secure the divider door 18 to the second lavatory door 32 in the position shown in FIG. 24. However, this is not a limitation on the present invention.

Figure 25:
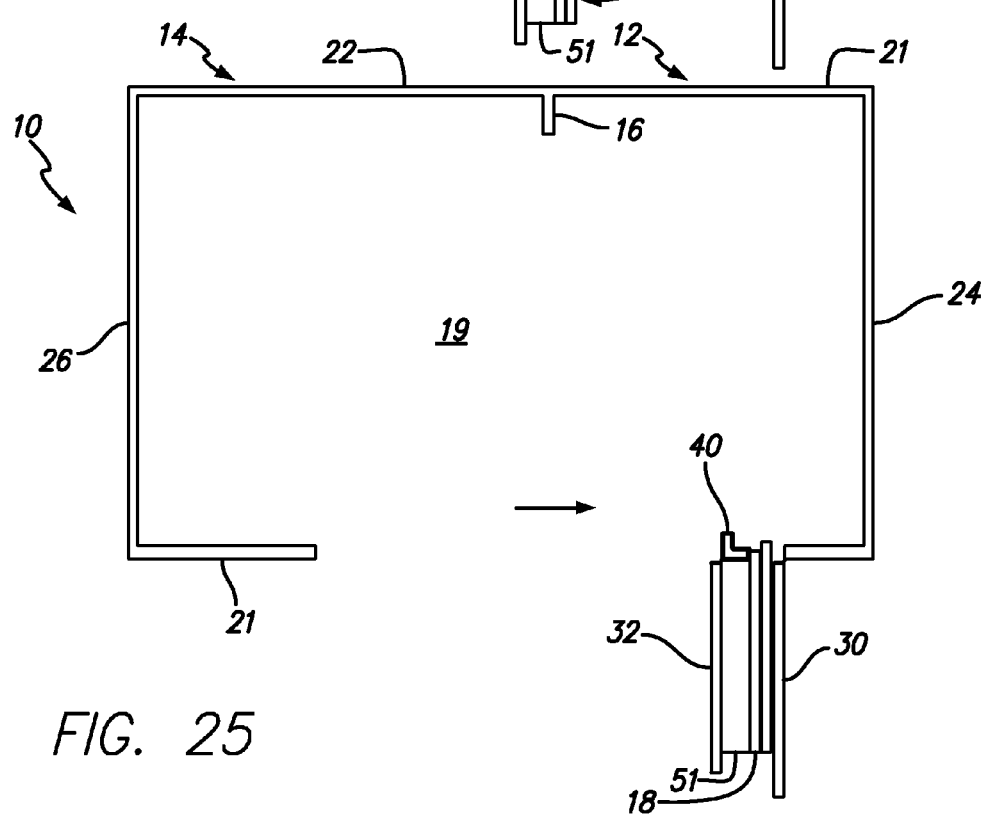
FIG. 25 is a top plan view of the lavatory monument assembly of FIG. 22 in the combined lavatory configuration.

Next, upper and lower slide locks, latches or releases 43 (see FIG. 5) are disengaged and the center post 40 (together with the divider door 18 and second lavatory door 32) are slid inboard toward the center of the aircraft from the home position to the stowed position, as is shown in FIG. 25. In a preferred embodiment, openings are the like are provided in the upper and lower door thresholds so that the upper and lower slide locks, latches or releases 43 can be inserted to lock the center post 40 in the stowed position. The upper and lower releases can be omitted or only an upper or only a lower release can be included.

Figure 26:
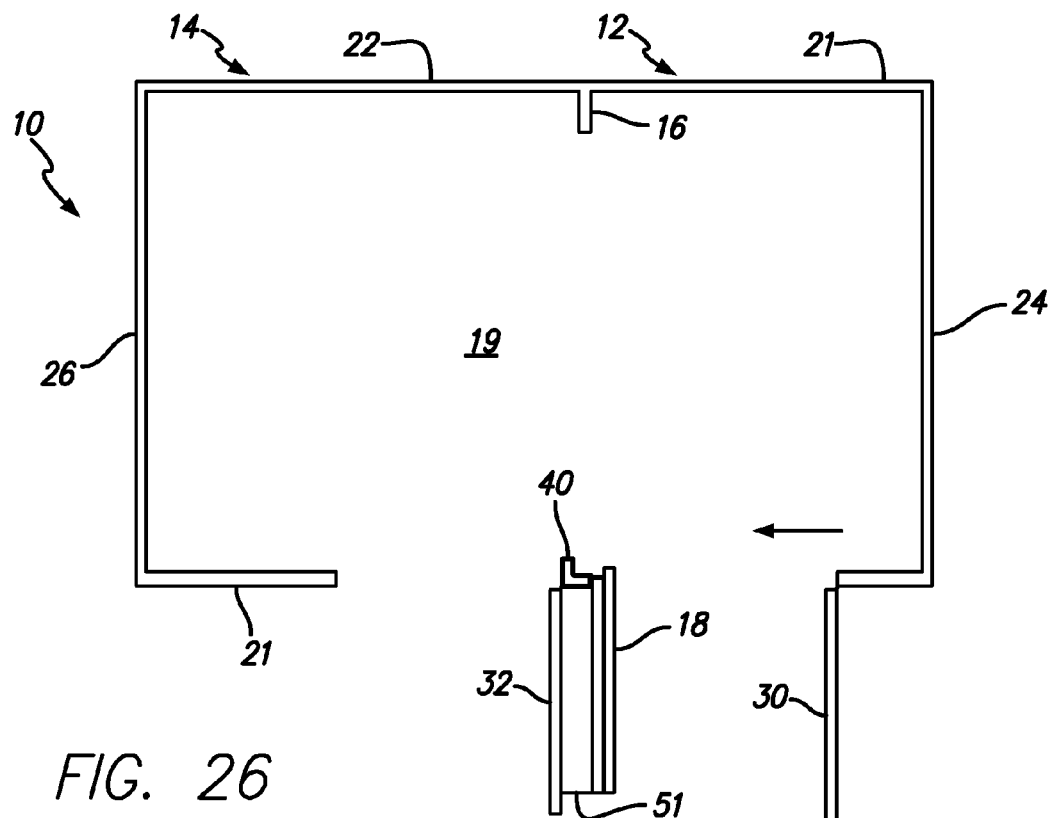
FIG. 26 is a top plan view of the lavatory monument assembly of FIG. 22 with the first lavatory door in the open position and the center post with the divider door and the second lavatory door secured together after being slid back to the home position.
Figure 27:
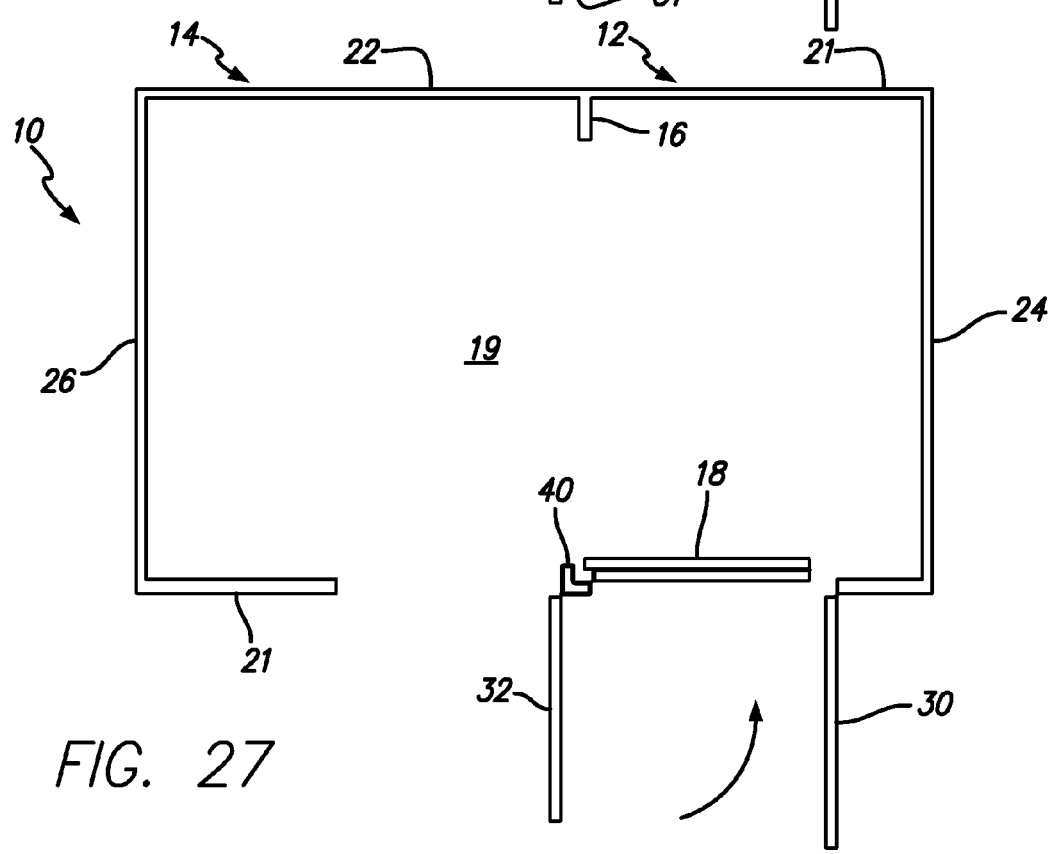
FIG. 27 is a top plan view of the lavatory monument assembly of FIG. 22 with the divider door in the open position, the first lavatory door in the open position and the second lavatory door in the open position.
Figure 28:
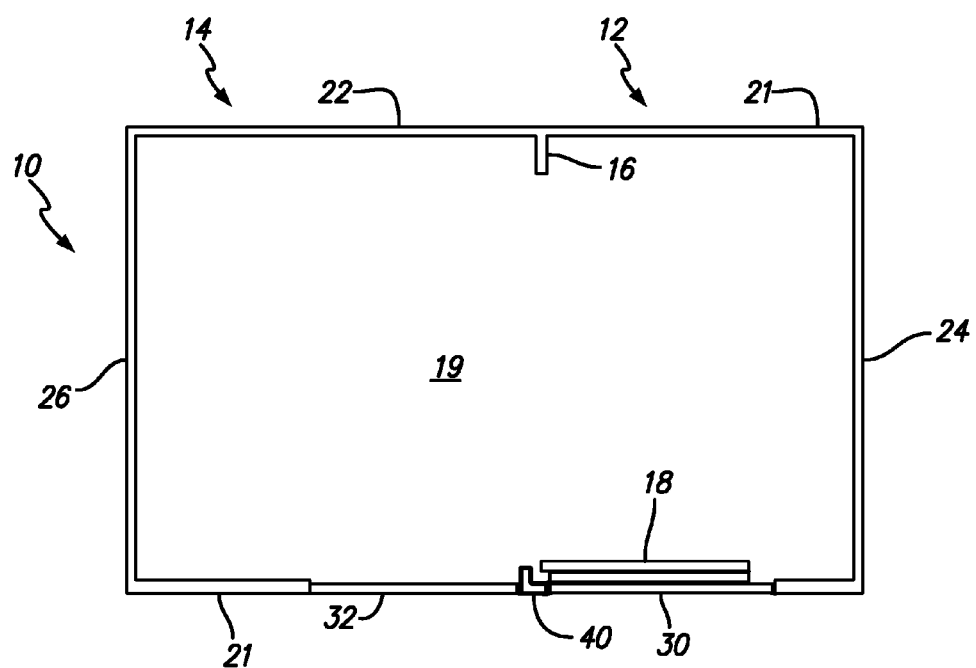
FIG. 28 is a top plan view of the lavatory monument assembly of FIG. 22 with the first and second lavatory doors closed, the divider door open and in the configuration where a PRM can use the lavatory.

At this point in the process the opening 34 is now large enough to allow a PRM to enter with a wheelchair. Once the PRM has transferred from the wheelchair to the toilet seat, a flight attendant or other person can now close the doors as described below to give the PRM some privacy. First, the center post 40 (together with the divider door 18 and second lavatory door 32) are slid outboard to the home position, as shown in FIG. 26. The divider door 18 is then pivoted to the position shown in FIG. 27. A lock, latch, etc. can be provided to lock the divider door in this position. The first and second lavatory doors 30 and 32 are then closed, as shown in FIG. 28. It will be appreciated that the steps can be varied as desired. For example, the first lavatory door 30 can be opened after the divider door 18 has been opened. In another embodiment, the first and second lavatory doors 30 and 32 are bi-fold doors.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, 6, other aspects may likewise be embodied as a means-plus-function claim, or in other forms, such as being embodied in a computer-readable medium. (Any claims intended to be treated under 35 U.S.C. §112, 6 will include the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A lavatory monument assembly configured to be positioned in the interior of an aircraft, the lavatory monument assembly comprising:
   an enclosure that includes at least a front wall and that defines an enclosure interior,
   a divider wall that extends rearwardly from the front wall, wherein the divider wall includes a divider door that is movable between a closed position and an open position, and wherein in the closed position the divider door divides the enclosure interior into a first lavatory interior and a second lavatory interior,
   wherein the front wall comprises a first lavatory door that is movable between a closed and an open position and provides access to the first lavatory interior, a second lavatory door that is movable between a closed and an open position and provides access to the second lavatory interior, and a vertically extending center post, wherein the second lavatory door is hingedly connected to the center post, and wherein the center post and the second lavatory door are movable to a stowed position when the second lavatory door is in the open position, wherein the center post moves along a linear path when moved to the stowed position.

2. The lavatory monument assembly of claim 1 wherein the divider door is a bi-fold door that is movable to the open position toward the front wall.

3. The lavatory monument assembly of claim 1 wherein the divider door is hingedly connected to the center post.

4. The lavatory monument assembly of claim 3 wherein the center post, the divider door, and the second lavatory door are movable to a stowed position when the second lavatory door is in the open position.

5. The lavatory monument assembly of claim 3 wherein the center post, second lavatory door and divider door are movable away from the first lavatory door.

6. The lavatory monument assembly of claim 3 wherein the center post, second lavatory door and divider door are movable to the stowed position toward the first lavatory door when the first lavatory door is in the open position.

7. The lavatory monument assembly of claim 3 wherein the divider door is securable to the second lavatory door when the divider door is in the open position.

8. The lavatory monument assembly of claim 1 wherein the center post and second lavatory door are movable together away from the first lavatory door.

9. The lavatory monument assembly of claim 1 wherein the center post and second lavatory door are movable together to the stowed position toward the first lavatory door when the first lavatory door is in the open position.

10. The lavatory monument assembly of claim 1 wherein the divider door is movable to the open position toward the rear wall.

11. The lavatory monument assembly of claim 10 wherein the center post and second lavatory door are movable to the stowed position toward the first lavatory door.

12. The lavatory monument assembly of claim 10 wherein the center post and second lavatory door are movable to the stowed position away from the first lavatory door.

13. The lavatory monument assembly of claim 1 wherein the center post moves along a linear path that is generally parallel to the front wall.

14. The lavatory monument assembly of claim 1 wherein the center post and the second lavatory door are movable to a stowed position after the second lavatory door has been moved to the open position.

15. A method of operating a lavatory monument assembly that includes at least a front wall and a divider wall that extends rearwardly from the front wall to divide the lavatory monument assembly into first and second lavatory interiors, wherein the lavatory monument assembly also includes a vertically extending center post to which at least one of a first lavatory door and a second lavatory door is hingedly connected, the method comprising the steps of:
   (a) moving one of the first lavatory door or the second lavatory door from a closed position to an open position, wherein the first lavatory door defines a first width and the second lavatory door defines a second width, (b) moving a divider door from a closed position to an open position, (c) moving the other of the first lavatory door and the second lavatory door from a closed position to an open position, and (d) moving the center post along a generally linear path from a home position to a stowed position to provide an opening that defines a third width, wherein the third width is larger than the first width and the third width is larger than the second width.

16. The method of claim 15 wherein the center post is movable in a direction that is generally parallel to a plane defined by the front wall.

17. The method of claim 16 wherein the divider door is movable away from the front wall when moved to the open position.

18. The method of claim 17 wherein the divider wall is hingedly connected to the center post.

19. The method of claim 18 further comprising the step of securing the divider wall to one of the first or second doors prior to step (c).

20. The method of claim 17 wherein the second lavatory door is hingedly connected to the center post, and wherein the center post and second lavatory door are movable together to the stowed position toward the first lavatory door.

21. The method of claim 17 wherein the second lavatory door is hingedly connected to the center post, and wherein the center post and second lavatory door are movable together to the stowed position away from the first lavatory door.

22. The method of claim 15 further comprising the step of moving the first lavatory door and the second lavatory door to the closed position while the divider door remains in the open position.

23. The method of claim 15 wherein steps (b) and (c) can be performed in any order.

* * * * *